(12) United States Patent
Liu et al.

(10) Patent No.: US 12,450,476 B2
(45) Date of Patent: Oct. 21, 2025

(54) COMPRESSION OF MACHINE-LEARNED MODELS BY VECTOR QUANTIZATION

(71) Applicant: Aurora Operations, Inc., Pittsburgh, PA (US)

(72) Inventors: Ting Wei Liu, Dollard-des-Ormeaux (CA); Julieta Martinez Covarrubias, Toronto (CA); Jashan Sunil Shewakramani, Waterloo (CA); Raquel Urtasun, Toronto (CA); Wenyuan Zeng, Toronto (CA)

(73) Assignee: AURORA OPERATIONS, INC., Pittsburgh, PA (US)

( * ) Notice: Subject to any disclaimer, the term of this patent is extended or adjusted under 35 U.S.C. 154(b) by 1066 days.

(21) Appl. No.: 17/388,781

(22) Filed: Jul. 29, 2021

(65) Prior Publication Data

US 2022/0036184 A1    Feb. 3, 2022

Related U.S. Application Data

(60) Provisional application No. 63/058,041, filed on Jul. 29, 2020.

(51) Int. Cl.
*G06N 3/08* (2023.01)
*G05B 13/02* (2006.01)
(Continued)

(52) U.S. Cl.
CPC ............. *G06N 3/08* (2013.01); *G05B 13/027* (2013.01); *G06N 20/00* (2019.01);
(Continued)

(58) Field of Classification Search
CPC .......... G06N 3/08; G06N 20/00; G06N 3/045; G06N 3/044; G06N 3/088; G06N 3/084;
(Continued)

(56) References Cited

U.S. PATENT DOCUMENTS

2022/0261616 A1*    8/2022    Li .............................. G06N 3/04

OTHER PUBLICATIONS

Cheng et al, "A Survey on Model Compression and Acceleration for Deep Neural Networks", arXiv:1710.09282v9, Jun. 14, 2020, 10 pages.
(Continued)

*Primary Examiner* — Pei Yong Weng
(74) *Attorney, Agent, or Firm* — Dority & Manning, P.A.

(57) ABSTRACT

A computing system can include one or more processors and one or more computer-readable media storing instructions that, when executed by the one or more processors, cause the computing system to perform operations including obtaining model structure data indicative of a plurality of parameters of a machine-learned model; determining a codebook comprising a plurality of centroids, the plurality of centroids having a respective index of a plurality of indices indicative of an ordering of the codebook; determining a plurality of codes respective to the plurality of parameters, the plurality of codes respectively comprising a code index of the plurality of indices corresponding to a closest centroid of the plurality of centroids to a respective parameter of the plurality of parameters; and providing encoded data as an encoded representation of the plurality of parameters of the machine-learned model, the encoded data comprising the codebook and the plurality of codes.

19 Claims, 6 Drawing Sheets

(51) Int. Cl.
  *G06N 20/00* (2019.01)
  *H03M 7/30* (2006.01)
  *G05D 1/00* (2006.01)
(52) U.S. Cl.
  CPC .......... *H03M 7/3082* (2013.01); *H03M 7/70* (2013.01); *G05D 1/0088* (2013.01); *G05D 1/0274* (2013.01)
(58) Field of Classification Search
  CPC .... G05B 13/027; H03M 7/3082; H03M 7/70; H03M 7/6041; G05D 1/0088; G05D 1/0274; G06V 10/762; G06V 10/82
  See application file for complete search history.

(56) References Cited

OTHER PUBLICATIONS

Courbariaux et al., "Binarized Neural Networks: Training Deep Neural Networks with Weights and Activations Constrained to +1 or −1", arXiv:1602.02830v3, Mar. 17, 2016, 11 pages.
Denil et al., "Predicting Parameters in Deep Learning", Conference on Neural Information Processing Systems, Dec. 5-10, 2013, Lake Tahoe, Nevada, United States, 9 pages.
Denton et al., "Exploiting Linear Structure Within Convolutional Networks for Efficient Evaluation", Conference on Neural Information Processing Systems, Dec. 8-13, 2014, Montreal, Canada, 9 pages.
Dong et al. "HAWQ-V2: Hessian Aware Trace-Weighted Quantization of Neural Networks", arXiv:1911.03852v1, Nov. 10, 2019, 13 pages.
Dong et al., "HAWQ: Hessian-Aware Quantization of Neural Networks with Mixed Precision", arXiv:1905.03696v1, Apr. 29, 2019, 12 pages.
Dong et al., "Learning to Prune Deep Neural Networks via Layer-wise Optimal Brain Surgeon", Conference on Neural Information Processing Systems, Dec. 4-9, 2017, Long Beach, California, United States, 11 pages.
Ge et al., "Optimized Product Quantization for Approximate Nearest Neighbor Search", Conference on Computer Vision and Pattern Recognition, Jun. 23-28, 2013, Portland, Oregon, pp. 2946-2953.
Gersho et al., "Vector Quantization and Signal Compression" Springer Science & Business Media, 1991, pages.
Gong et al., "Compressing Deep Convolutional Networks using Vector Quantization", arXiv:1412.6115v1, Dec. 18, 2014, 10 pages.
Guo et al., "Dynamic Network Surgery for Efficient DNNs", arXiv:1608.04493v2, Nov. 10, 2016, 9 pages.
Guo, "A Survey on Methods and Theories of Quantized Neural Networks", arXiv:1808.04752v2, Dec. 16, 2018, 17 pages.
Han et al., "Deep Compression: Compressing Deep Neural Networks with Pruning, Trained Quantization and Huffman Coding", arXiv:1510.00149v5, Feb. 15, 2016, 14 pages.
Han et al., "Learning both Weights and Connections for Efficient Neural Networks", arXiv:1506.02626v3, Oct. 30, 2015, 9 pages.
Hassibi et al., "Second Order Derivatives for Network Pruning: Optimal Brain Surgeon", Conference on Neural Information Processing Systems, 1993, Denver, Colorado, United States, pp. 164-171.
He et al., "Mask R-CNN", arXiv:1703.06870v3, Jan. 24, 2018, 12 pages.
He et al., "AMC: AutoML for Model Compression and Acceleration on Mobile Devices", arXiv:1802.03494v4, Jan. 16, 2019, 17 pages.
He et al., "Channel Pruning for Accelerating Very Deep Neural Networks", arXiv:1707.06168v2, Aug. 21, 2017, 10 pages.
He et al., "Deep Residual Learning for Image Recognition", arXiv:1512.03385v1, Dec. 10, 2015, 12 pages.
Hinton et al., "Distilling the Knowledge in a Neural Network", arXiv:1503.02531v1, Mar. 9, 2015, 9 pages.
Jaderberg et al., "Speeding up Convolutional Neural Networks with Low Rank Expansions", arXiv:1405.3866v1, May 15, 2014, 12 pages.
Jegou et al., "Product Quantization for Nearest Neighbor Search", Transactions on Pattern Analysis and Machine Intelligence, vol. 33 No. 1, 12 pages.
Kingma et al, "Adam: a Method for Stochastic Optimization", arXiv:1412.6980v9, Jan. 30, 2017, 15 pages.
Lebedev et al., "Speeding-up Convolutional Neural Networks Using Fine-tuned CP-Decomposition", arXiv:1412.6553v3, Apr. 24, 2015, 11 pages.
Li et al, "Fully Quantized Network for Object Detection", Conference on Computer Vision and Pattern Recognition, Jun. 16-20, 2019, Long Beach, California, United States, pp. 2810-2819.
Li et al., "Pruning Filters for Efficient ConvNets", arXiv:1608.08710v3, Mar. 10, 2017, 13 pages.
Lin et al, "Focal Loss for Dense Object Detection", International Conference on Computer Vision, Oct. 22-29, 2017, Venice, Italy, pp. 2980-2988.
Lin et al, "Microsoft COCO: Common Objects in Context", arXiv:1405.0312v3, Feb. 21, 2015, 15 pages.
Lin et al, "Towards Accurate Binary Convolutional Neural Network", arXiv1711.11294v1, Nov. 30, 2017, 14 pages.
Lourenco et al., "Iterated Local Search", Handbook of MetaHeuristics, 49 pages.
Novikov et al., "Tensorizing Neural Networks", Conference on Neural Information Processing Systems, Dec. 7-12, 2015, Montreal, Canada, 9 pages.
Rastegari et al., "XNOR-Net: ImageNet Classification Using Binary Convolutional Neural Networks", arXiv:1603.05279v4, Aug. 2, 2016, 17 pages.
Shayer et al, "Learning Discrete Weights Using the Local Reparameterization Trick", arXiv:1710.07739v3, Feb. 2, 2018, 12 pages.
Sivic et al., "Video Google: a Text Retrieval Approach to Object Matching in Videos", International Conference on Computer Vision, Oct. 14-17, 2003, Nice, France, 8 pages.
Son et al., "Clustering Convolutional Kernels to Compress Deep Neural Networks", European Conference on Computer Vision, Sep. 8-14, 2018, Munich, Germany, 17 pages.
Stock et al., "And the Bit Goes Down: Revisiting the Quantization of Neural Networks", arXiv:1907.05686v5, Nov. 9, 2020, 11 pages.
Thomee et al., "YFCC100M: The New Data in Multimedia Research", arXiv:1503.01817v2, Apr. 25, 2016, 8 pages.
Tieleman et al, "Lecture 6.5-rmsprop: Divide the gradient by a running average of its recent magnitude", COURSERA: Neural networks for machine learning, 4(2):26-31, 2012.
Tung et al., "Deep Neural Network Compression by In-Parallel Pruning-Quantization", Pattern Analysis and Machine Intelligence, Dec. 2018, 12 pages.
Wang et al, "HAQ: Hardware-Aware Automated Quantization with Mixed Precision", arXiv:1811.08886v3, Apr. 6, 2019, 10 pages.
Wu et al., "Quantized Convolutional Neural Networks for Mobile Devices", arXiv:1512.06473v3, May 16, 2016, 11 pages.
Yalniz et al, "Billion-Scale Semi-Supervised Learning for Image Classification", arXiv:1905.00546v1, May 2, 2019, 12 pages.
Zeger et al., "Globally Optimal Vector Quantizer Design by Stochastic Relaxation", IEEE Transaction on Signal Processing, vol. 40, No. 2, Feb. 1992, pp. 310-322.
Zeger et al., "Stochastic Relaxation Algorithm for Improved Vector Quantiser Design", Electronics Letters, vol. 25, No. 14, Jul. 6, 1989, pp. 896-898.
Zhu et al., "Trained Ternary Quantization", arXiv:1612.01064v3, Feb. 23, 2017, 10 pages.

* cited by examiner

COMPRESSION OF MACHINE-LEARNED MODELS BY VECTOR QUANTIZATION

RELATED APPLICATION

The present application is based on and claims the benefit of U.S. Provisional Patent Application No. 63/058,041 having a filing date of Jul. 29, 2020, which is incorporated by reference herein.

BACKGROUND

The present disclosure relates generally to machine-learned modeling techniques. In particular, the present disclosure relates to machine-learned model compression techniques that can be used with robotic platforms, for example, autonomous vehicles. Robots, including autonomous vehicles, can receive data that is used to perceive an environment through which the robot can travel. Robots can rely on machine-learned models to detect objects within an environment. The effective operation of a robot can depend on accurate and efficient object detection provided by the machine-learned models. Various machine-learned compression and training techniques can be applied to improve such object detection.

SUMMARY

Aspects and advantages of embodiments of the present disclosure will be set forth in part in the following description, or may be learned from the description, or may be learned through practice of the embodiments.

One example aspect of the present disclosure is directed to a computing system for compression of machine-learned models by vector quantization. The computing system can include one or more processors and one or more computer-readable media storing instructions that, when executed by the one or more processors, cause the computing system to perform operations including obtaining model structure data indicative of a plurality of parameters of a machine-learned model; determining a codebook including a plurality of centroids, the plurality of centroids having a respective index of a plurality of indices indicative of an ordering of the codebook; determining a plurality of codes respective to the plurality of parameters, the plurality of codes respectively including a code index of the plurality of indices corresponding to a closest centroid of the plurality of centroids to a respective parameter of the plurality of parameters; and providing encoded data as an encoded representation of the plurality of parameters of the machine-learned model, the encoded data including the codebook and the plurality of codes.

In some implementations, the plurality of parameters includes a plurality of weights of at least one layer of the machine-learned model, the plurality of weights including a weight matrix of the at least one layer. In some implementations, the weight matrix includes a plurality of subvectors, each subvector of the plurality of subvectors including a block of contiguous scalars in a column of the weight matrix, and the plurality of codes are respective to the plurality of subvectors. In some implementations, the at least one layer includes a fully-connected (FC) layer, and the plurality of weights includes weights of connections from a prior layer to the fully-connected layer. In some implementations, the at least one layer includes a convolutional layer, the plurality of weights includes weights of a convolutional kernel, and the weight matrix is reshaped into a two-dimensional matrix.

In some implementations, the weight matrix is permuted by a row permutation matrix, and the operations include determining the row permutation matrix such that a determinant of a covariance of the plurality of weights is optimized. in some implementations, determining the row permutation matrix includes: obtaining an initial row permutation matrix that optimizes a product of diagonal elements of the initial row permutational matrix, where obtaining the initial row permutation matrix includes: determining a plurality of buckets of row indices; determining a variance of each row of the weight matrix; assigning each row index of the plurality of buckets of row indices to a non-full bucket that results in a lowest variance of the plurality of buckets; and interlacing rows from the plurality of buckets such that rows from a same bucket are placed a number of rows apart; and determining the row permutation matrix includes iteratively searching a plurality of candidate permutations of the initial row permutation matrix to select the row permutation matrix as a selected candidate permutation of the plurality of candidate permutations based at least in part on a determinant of a covariance of the selected candidate permutation.

In some implementations, determining the codebook including the plurality of centroids includes learning the plurality of centroids simultaneously with the plurality of codes to optimize a reconstruction error between the plurality of parameters and an approximated plurality of parameters that is reconstructed from the encoded data. In some implementations, the reconstruction error is optimized by minimizing a covariance of the plurality of parameters. In some implementations, the closest centroid to the respective parameter is closest to the respective parameter in Euclidean distance. In some implementations, subsequent to initialization of the plurality of codes and the codebook, the plurality of codes and the codebook are iteratively updated with random noise over one or more update iterations. In some implementations, subsequent to updating the plurality of codes and the codebook with random noise over the one or more update iterations, the plurality of centroids is fine-tuned by gradient-based learning.

In some implementations, the machine-learned model includes a deep neural network. In some implementations, the operations include detecting one or more objects in an environment using the encoded representation of the plurality of parameters of the machine-learned model. In some implementations, the codebook includes a lookup table comprising the plurality of centroids, and the code index for the respective parameter indexes the closest centroid in the lookup table.

Another example aspect of the present disclosure is directed to a computer-implemented method for compressing a machine-learned model. The computer-implemented method includes obtaining model structure data indicative of a plurality of parameters of a machine-learned model; determining a codebook including a plurality of centroids, the plurality of centroids having a respective index of a plurality of indices indicative of an ordering of the codebook; determining a plurality of codes respective to the plurality of parameters, the plurality of codes respectively including a code index of the plurality of indices corresponding to a closest centroid of the plurality of centroids to a respective parameter of the plurality of parameters; and providing encoded data as an encoded representation of the plurality of parameters of the machine-learned model, the encoded data including the codebook and the plurality of codes; wherein the plurality of parameters includes a plurality of weights of at least one layer of the machine-learned model, the plurality of weights including a weight matrix of the at least one layer.

In some implementations, the weight matrix is permuted by a row permutation matrix, and the method includes determining the row permutation matrix such that a determinant of a covariance of the plurality of weights is optimized; where determining the row permutation matrix includes: obtaining an initial row permutation matrix that optimizes a product of diagonal elements of the initial row permutational matrix, where obtaining the initial row permutation matrix includes: determining a plurality of buckets of row indices; determining a variance of each row of the weight matrix; assigning each row index of the plurality of buckets of row indices to a non-full bucket that results in a lowest variance of the plurality of buckets; and interlacing rows from the plurality of buckets such that rows from a same bucket are placed a number of rows apart; and determining the row permutation matrix includes iteratively searching a plurality of candidate permutations of the initial row permutation matrix to select the row permutation matrix as a selected candidate permutation of the plurality of candidate permutations based at least in part on a determinant of a covariance of the selected permutation.

In some implementations, determining the codebook includes the plurality of centroids includes learning the plurality of centroids simultaneously with the plurality of codes to optimize a reconstruction error between the plurality of parameters and an approximated plurality of parameters that is reconstructed from the encoded data, wherein the reconstruction error is optimized by minimizing a covariance of the plurality of parameters. In some implementations, subsequent to initialization of the plurality of codes and the codebook, the plurality of codes and the codebook are iteratively updated with random noise over one or more update iterations; and, subsequent to updating the plurality of codes and the codebook with random noise over the one or more update iterations, the plurality of centroids is fine-tuned by gradient-based learning. In some implementations, the method further includes detecting one or more objects in an environment using the encoded representation of the plurality of parameters of the machine-learned model.

Other example aspects of the present disclosure are directed to other systems, methods, vehicles, apparatuses, tangible non-transitory computer-readable media, and devices for generating data (e.g., scene representations, simulation data, etc.), training models, and performing other functions described herein. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
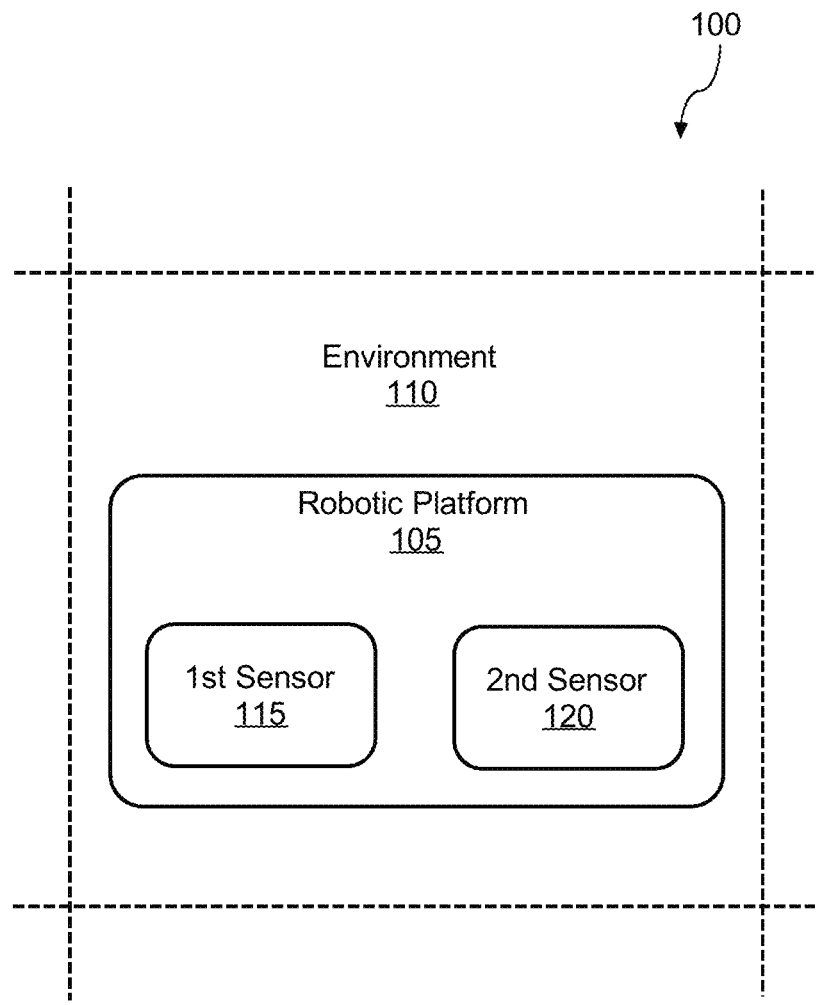
FIG. 1 depicts a block diagram of an example computing platform according to example implementations of the present disclosure.

Aspects of the present disclosure are directed to improved systems and methods for compression of machine-learned models by vector quantization. Machine-learned models, such as neural networks, can be useful for many otherwise challenging robotics tasks, such as tasks relating to operation of an at least partially autonomous, or self-driving, vehicle, or other partial or complete navigation assistance tasks for a vehicle. These models, especially overparameterized models, can be compressed to reduce computing resource requirements for deploying, storing, or otherwise using the models while providing accuracy that is near or equal to uncompressed models. Reduced-size models having sufficient accuracy can be useful in providing applications that rely on mobile and/or low-power computational platforms for large-scale deployment.

As one example, a robotic platform (or one or more sensors thereof) can be configured to obtain multi-modal sensor data indicative of an environment. The robotic platform can include, for example, an autonomous vehicle. A computing system (e.g., onboard and/or remote from the autonomous vehicle) can obtain sensor data indicative of an environment of a robotic platform. The sensor data can include image data such as a plurality of images (e.g., captured through camera(s)) and/or depth information (e.g., captured through LIDAR system(s)). The computing system can provide the sensor data as an input to a machine-learned object recognition model and receive, as an output of the machine-learned object recognition model, a scene representation descriptive of the environment of the robotic platform. Retrieval systems, such as those that enable visual search, can present heavy computational resource demands.

A significant portion of memory usage in storing machine-learned model(s), such as neural network(s), results from storing parameters of the machine-learned model, such as weights of layers of the neural network. Thus, compressing parameters of the machine-learned model can provide for a significant reduction in size of the model. For instance, one example implementation provides for compressing a neural network by compressing a weight matrix including weights of one or more layer(s) (e.g., each layer) of the neural network. As an example, an encoding of the weight matrix can be learned. The encoding of the weight matrix can be stored in place of the weight matrix. The encoding can require fewer computational resources (e.g., less memory) to store and/or deploy. The encoding can be decoded to an approximated weight matrix that approximates the original weight matrix to a suitable degree. The approximated weight matrix can be used to construct a neural network that uses the approximated weight matrix as the weights for its layer(s). Given the approximation of the approximated weight matrix, the neural network constructed according to the approximated weight matrix can include similar activations for its layer(s) and/or similar, if not identical, output(s).

The present disclosure recognizes that quantization error of at least some parameters of some machine-learned models (e.g., network weights of a neural network) can be inversely correlated with accuracy of the machine-learned model(s) after tuning of a codebook (e.g., a stored representation of the structure of a data collection describing a compressed machine-learned model) used in compressing the machine-learned model(s). The present disclosure additionally recognizes the invariance of some machine-learned models (e.g., neural networks) under permutation of their weights for the purposes of compression. Thus, example aspects of the present disclosure provide systems and methods for compressing a machine-learned model by optimizing for reconstruction error of the parameters of the machine-learned model as a starting point for gradient-based optimization. Example aspects of the present disclosure can additionally provide for selecting equivalent models (e.g., neural networks) that are easier to quantize, thereby reducing computational cost and/or computing resource usage. Additionally, example aspects of the present disclosure can provide an annealed k-means algorithm that reduces quantization error.

Aspects of the present disclosure can provide a number of technical improvements to simulation, robotics, and computer vision technology. For instance, systems and methods according to example aspects of the present disclosure can leverage encoded data including a codebook and a plurality of codes to reduce memory usage, computational footprint, and/or other computing resource usage to store and/or deploy machine-learned models. Reducing the computing resource usage of machine-learned models, such as, for example, large-scale deep neural networks, among other models, can be beneficial in deploying the machine-learned models to resource-constrained or limited-resource computing systems, such as those in robotics applications (e.g., autonomous vehicles). In addition, some example aspects of the present disclosure can provide for compressing machine-learned models with reduced quantization error, which can improve accuracy of compressed models.

The following describes the technology of this disclosure within the context of an autonomous vehicle for example purposes only. As described herein, the technology described herein is not limited to an autonomous vehicle and can be implemented within other robotic and computing systems.

With reference now to FIGS. 1-6, example embodiments of the present disclosure will be discussed in further detail. FIG. 1 depicts a block diagram of an example operational scenario 100 according to example implementations of the present disclosure. The operational scenario 100 includes a robotic platform 105 and an environment 110. The environment 110 can be external to the robotic platform 105. The robotic platform 105, for example, can operate within the environment 110. The environment 110 can include an indoor environment (e.g., within one or more facilities) or an outdoor environment. An outdoor environment, for example, can include one or more areas in the outside world such as, for example, one or more rural areas (e.g., with one or more rural travel ways, etc.), one or more urban areas (e.g., with one or more city travel ways, etc.), one or more suburban areas (e.g., with one or more suburban travel ways, etc.), etc. An indoor environment, for example, can include environments enclosed by a structure such as a building (e.g., a service depot, manufacturing facility, etc.).

The robotic platform 105 can include one or more sensor(s) 115, 120. The one or more sensors 115, 120 can be configured to generate or store data descriptive of the environment 110 (e.g., one or more static or dynamic objects therein). The sensor(s) 115, 120 can include one or more Light Detection and Ranging (LiDAR) systems, one or more Radio Detection and Ranging (RADAR) systems, one or more cameras (e.g., visible spectrum cameras or infrared cameras), one or more sonar systems, one or more motion sensors, or other types of image capture devices or sensors. The sensor(s) 115, 120 can include multiple sensors of different types. For instance, the sensor(s) 115, 120 can include one or more first sensor(s) 115 and one or more second sensor(s) 120. The first sensor(s) 115 can include a different type of sensor than the second sensor(s) 120. By way of example, the first sensor(s) 115 can include one or more imaging device(s) (e.g., cameras, etc.), whereas the second sensor(s) 120 can include one or more depth measuring device(s) (e.g., LiDAR device, etc.).

The robotic platform 105 can include any type of platform configured to operate with the environment 110. For example, the robotic platform 105 can include one or more different type(s) of vehicle(s) configured to perceive and operate within the environment 110. The vehicles, for example, can include one or more autonomous vehicle(s) such as, for example, one or more autonomous trucks. By way of example, the robotic platform 105 can include an autonomous truck including an autonomous tractor coupled to a cargo trailer. In addition, or alternatively, the robotic platform 105 can include any other type of vehicle such as one or more aerial vehicles, ground-based vehicles, water-based vehicles, space-based vehicles, etc.

Figure 2:
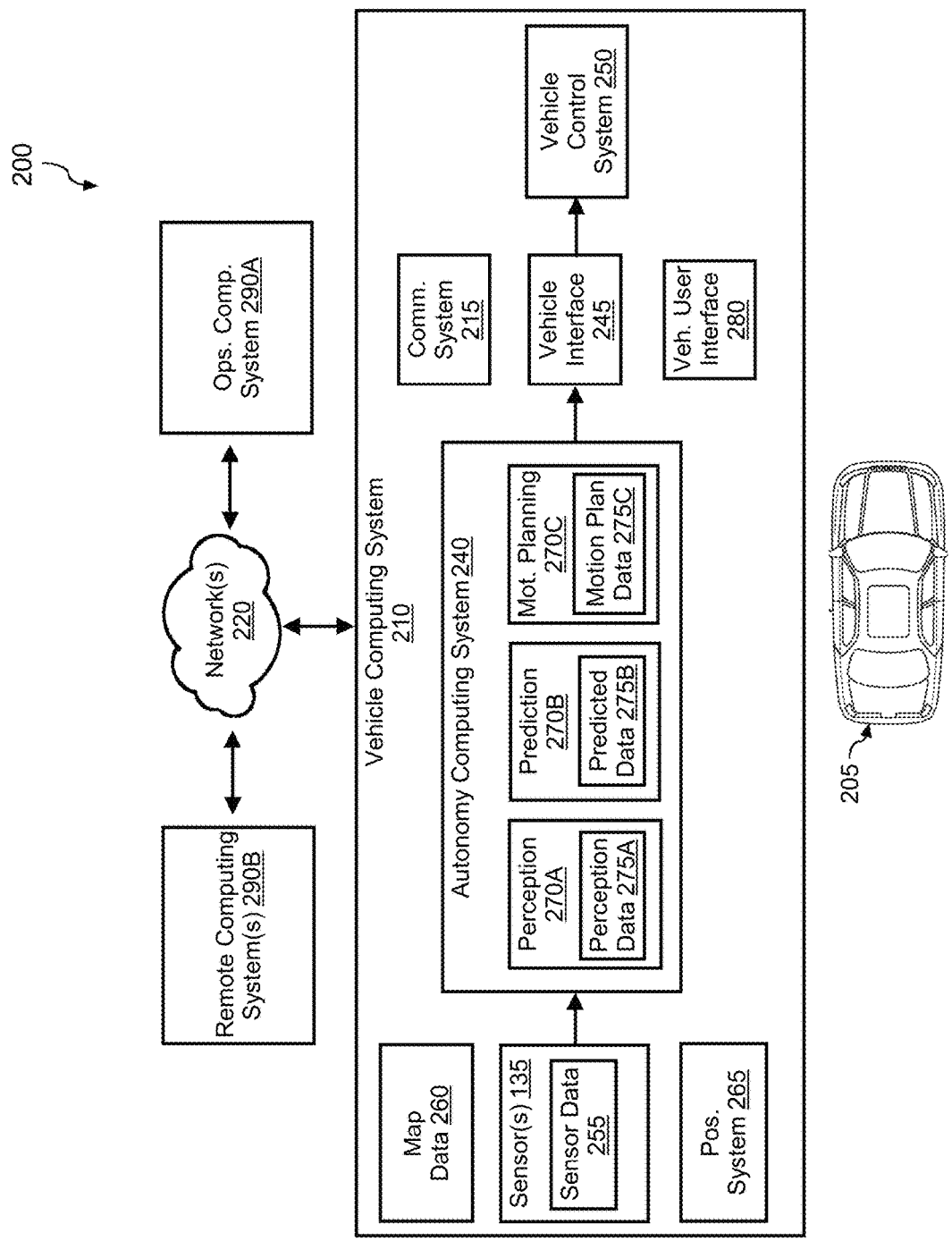
FIG. 2 depicts a block diagram of an example system according to example implementations of the present disclosure.

FIG. 2 depicts an overview of an example system 200 of the robotic platform as an autonomous vehicle according to example implementations of the present disclosure. More particularly, FIG. 2 illustrates a vehicle 205 including various systems and devices configured to control the operation of the vehicle 205. For example, the vehicle 205 can include an onboard vehicle computing system 210 (e.g., located on or within the autonomous vehicle, etc.) that is configured to operate the vehicle 205. Generally, the vehicle computing system 210 can obtain sensor data 255 from one or more sensors 235 (e.g., first sensor(s) 115, second sensor(s) 120 of FIG. 1) onboard the vehicle 205, attempt to comprehend the vehicle's surrounding environment by performing various processing techniques on the sensor data 255, and generate an appropriate motion plan through the vehicle's surrounding environment (e.g., environment 110 of FIG. 1).

The vehicle 205 incorporating the vehicle computing system 210 can be various types of vehicles. For instance, the vehicle 205 can be an autonomous vehicle. The vehicle 205 can be a ground-based autonomous vehicle (e.g., car, truck, bus, etc.). The vehicle 205 can be an air-based autonomous vehicle (e.g., airplane, helicopter, vertical take-off and lift (VTOL) aircraft, etc.). The vehicle 205 can be a lightweight elective vehicle (e.g., bicycle, scooter, etc.). The vehicle 205 can be another type of vehicle (e.g., watercraft, etc.). The vehicle 205 can drive, navigate, operate, etc. with minimal or no interaction from a human operator (e.g., driver, pilot, etc.). In some implementations, a human operator can be omitted from the vehicle 205 (or also omitted from remote control of the vehicle 205). In some implementations, a human operator can be included in the vehicle 205.

The vehicle 205 can be configured to operate in a plurality of operating modes. The vehicle 205 can be configured to operate in a fully autonomous (e.g., self-driving) operating mode in which the vehicle 205 is controllable without user input (e.g., can drive and navigate with no input from a human operator present in the vehicle 205 or remote from the vehicle 205). The vehicle 205 can operate in a semi-autonomous operating mode in which the vehicle 205 can operate with some input from a human operator present in the vehicle 205 (or a human operator that is remote from the vehicle 205). The vehicle 205 can enter into a manual operating mode in which the vehicle 205 is fully controllable by a human operator (e.g., human driver, pilot, etc.) and can be prohibited or disabled (e.g., temporary, permanently, etc.) from performing autonomous navigation (e.g., autonomous driving, flying, etc.). The vehicle 205 can be configured to operate in other modes such as, for example, park or sleep modes (e.g., for use between tasks/actions such as waiting to provide a vehicle service, recharging, etc.). In some implementations, the vehicle 205 can implement vehicle operating assistance technology (e.g., collision mitigation system, power assist steering, etc.), for example, to help assist the human operator of the vehicle 205 (e.g., while in a manual mode, etc.).

To help maintain and switch between operating modes, the vehicle computing system 210 can store data indicative of the operating modes of the vehicle 205 in a memory onboard the vehicle 205. For example, the operating modes can be defined by an operating mode data structure (e.g., rule, list, table, etc.) that indicates one or more operating parameters for the vehicle 205, while in the particular operating mode. For example, an operating mode data structure can indicate that the vehicle 205 is to autonomously plan its motion when in the fully autonomous operating mode. The vehicle computing system 210 can access the memory when implementing an operating mode.

The operating mode of the vehicle 205 can be adjusted in a variety of manners. For example, the operating mode of the vehicle 205 can be selected remotely, off-board the vehicle 205. For example, a remote computing system (e.g., of a vehicle provider or service entity associated with the vehicle 205) can communicate data to the vehicle 205 instructing the vehicle 205 to enter into, exit from, maintain, etc. an operating mode. By way of example, such data can instruct the vehicle 205 to enter into the fully autonomous operating mode.

In some implementations, the operating mode of the vehicle 205 can be set onboard or near the vehicle 205. For example, the vehicle computing system 210 can automatically determine when and where the vehicle 205 is to enter, change, maintain, etc. a particular operating mode (e.g., without user input). Additionally, or alternatively, the operating mode of the vehicle 205 can be manually selected through one or more interfaces located onboard the vehicle 205 (e.g., key switch, button, etc.) or associated with a computing device within a certain distance to the vehicle 205 (e.g., a tablet operated by authorized personnel located near the vehicle 205 and connected by wire or within a wireless communication range). In some implementations, the operating mode of the vehicle 205 can be adjusted by manipulating a series of interfaces in a particular order to cause the vehicle 205 to enter into a particular operating mode.

The operations computing system 290A can include multiple components for performing various operations and functions. For example, the operations computing system 290A can be configured to monitor and communicate with the vehicle 205 or its users to coordinate a vehicle service provided by the vehicle 205. To do so, the operations computing system 290A can communicate with the one or more remote computing system(s) 290B or the vehicle 205 through one or more communications network(s) including the network(s) 220. The network(s) 220 can send or receive signals (e.g., electronic signals) or data (e.g., data from a computing device) and include any combination of various wired (e.g., twisted pair cable) or wireless communication mechanisms (e.g., cellular, wireless, satellite, microwave, and radio frequency) or any desired network topology (or topologies). For example, the network 220 can include a local area network (e.g., intranet), wide area network (e.g., the Internet), wireless LAN network (e.g., through Wi-Fi), cellular network, a SATCOM network, VHF network, a HF network, a WiMAX based network, or any other suitable communications network (or combination thereof) for transmitting data to or from the vehicle 205.

Each of the one or more remote computing system(s) 290B or the operations computing system 290A can include one or more processors and one or more memory devices. The one or more memory devices can be used to store instructions that when executed by the one or more processors of the one or more remote computing system(s) 290B or operations computing system 290A cause the one or more processors to perform operations or functions including operations or functions associated with the vehicle 205 including sending or receiving data or signals to or from the vehicle 205, monitoring the state of the vehicle 205, or controlling the vehicle 205. The one or more remote computing system(s) 290B can communicate (e.g., exchange data or signals) with one or more devices including the operations computing system 290A and the vehicle 205 through the network 220.

The one or more remote computing system(s) 290B can include one or more computing devices such as, for example, one or more operator devices associated with one or more vehicle providers (e.g., providing vehicles for use by the service entity), user devices associated with one or more vehicle passengers, developer devices associated with one or more vehicle developers (e.g., a laptop/tablet computer configured to access computer software of the vehicle computing system 210), etc. One or more of the devices can receive input instructions from a user or exchange signals or data with an item or other computing device or computing system (e.g., the operations computing system 290A). Further, the one or more remote computing system(s) 290B can be used to determine or modify one or more states of the vehicle 205 including a location (e.g., a latitude and longitude), a velocity, an acceleration, a trajectory, a heading, or a path of the vehicle 205 based in part on signals or data exchanged with the vehicle 205. In some implementations, the operations computing system 290A can include the one or more remote computing system(s) 290B.

The vehicle computing system 210 can include one or more computing devices located onboard the vehicle 205. For example, the computing device(s) can be located on or within the vehicle 205. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 205 (e.g., its computing system, one or more processors, etc.) to perform operations and functions, such as those described herein for collecting training data, communicating with other computing systems, etc.

The vehicle 205 can include a communications system 215 configured to allow the vehicle computing system 210 (and its computing device(s)) to communicate with other computing devices. The communications system 215 can include any suitable components for interfacing with one or more network(s) 220, including, for example, transmitters, receivers, ports, controllers, antennas, or other suitable components that can help facilitate communication. In some implementations, the communications system 215 can include a plurality of components (e.g., antennas, transmitters, or receivers) that allow it to implement and utilize multiple-input, multiple-output (MIMO) technology and communication techniques.

The vehicle computing system 210 can use the communications system 215 to communicate with one or more computing device(s) that are remote from the vehicle 205 over one or more networks 220 (e.g., through one or more wireless signal connections). The network(s) 220 can exchange (send or receive) signals (e.g., electronic signals), data (e.g., data from a computing device), or other information and include any combination of various wired (e.g., twisted pair cable) or wireless communication mechanisms (e.g., cellular, wireless, satellite, microwave, and radio frequency) or any desired network topology (or topologies). For example, the network(s) 220 can include a local area network (e.g., intranet), wide area network (e.g., Internet), wireless LAN network (e.g., through Wi-Fi), cellular network, a SATCOM network, VHF network, a HF network, a WiMAX based network, or any other suitable communication network (or combination thereof) for transmitting data to or from the vehicle 205 or among computing systems.

As shown in FIG. 2, the vehicle computing system 210 can include the one or more sensors 235, the autonomy computing system 240, the vehicle interface 245, the one or more vehicle control systems 250, and other systems, as described herein. One or more of these systems can be configured to communicate with one another through one or more communication channels. The communication channel(s) can include one or more data buses (e.g., controller area network (CAN)), on-board diagnostics connector (e.g., OBD-II), or a combination of wired or wireless communication links. The onboard systems can send or receive data, messages, signals, etc. amongst one another through the communication channel(s).

In some implementations, the sensor(s) 235 can include at least two different types of sensor(s). For instance, the sensor(s) 235 can include at least one first sensor (e.g., the first sensor(s) 115, etc.) and at least one second sensor (e.g., the second sensor(s) 120, etc.). The at least one first sensor can be a different type of sensor than the at least one second sensor. For example, the at least one first sensor can include one or more image capturing device(s) (e.g., one or more cameras, RGB cameras, etc.). In addition, or alternatively, the at least one second sensor can include one or more depth capturing device(s) (e.g., LiDAR sensor, etc.). The at least two different types of sensor(s) can obtain multi-modal sensor data indicative of one or more static or dynamic objects within an environment of the vehicle 205. As described herein with reference to the remaining figures, the multi-modal sensor data can be provided to the operational computing system 290A for use in generating scene representations without the dynamic objects, simulation data for robotic platform testing, or training one or more machine-learned models of the vehicle computing system 210.

The sensor(s) 235 can be configured to acquire sensor data 255. The sensor(s) 235 can be external sensors configured to acquire external sensor data. This can include sensor data associated with the surrounding environment of the vehicle 205. The surrounding environment of the vehicle 205 can include/be represented in the field of view of the sensor(s) 235. For instance, the sensor(s) 235 can acquire image or other data of the environment outside of the vehicle 205 and within a range or field of view of one or more of the sensor(s) 235. This can include different types of sensor data acquired by the sensor(s) 235 such as, for example, data from one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), or other types of imaging capture devices or sensors. The one or more sensors can be located on various parts of the vehicle 205 including a front side, rear side, left side, right side, top, or bottom of the vehicle 205. The sensor data 255 can include image data (e.g., 2D camera data, video data, etc.), RADAR data, LIDAR data (e.g., 3D point cloud data, etc.), audio data, or other types of data. The vehicle 205 can also include other sensors configured to acquire data associated with the vehicle 205. For example, the vehicle 205 can include inertial measurement unit(s), wheel odometry devices, or other sensors.

The sensor data 255 can be indicative of one or more objects within the surrounding environment of the vehicle 205. The object(s) can include, for example, vehicles, pedestrians, bicycles, or other objects. The object(s) can be located in front of, to the rear of, to the side of, above, below the vehicle 205, etc. The sensor data 255 can be indicative of locations associated with the object(s) within the surrounding environment of the vehicle 205 at one or more times. The object(s) can be static objects (e.g., not in motion) or dynamic objects/actors (e.g., in motion or likely to be in motion) in the vehicle's environment. The sensor data 255 can also be indicative of the static background of the environment. The sensor(s) 235 can provide the sensor data 255 to the autonomy computing system 240, the remote computing system(s) 290B, or the operations computing system 290A.

In addition to the sensor data 255, the autonomy computing system 240 can obtain map data 260. The map data 260 can provide detailed information about the surrounding environment of the vehicle 205 or the geographic area in which the vehicle was, is, or will be located. For example, the map data 260 can provide information regarding: the identity and location of different roadways, road segments, buildings, or other items or objects (e.g., lampposts, crosswalks or curb); the location and directions of traffic lanes (e.g., the location and direction of a parking lane, a turning lane, a bicycle lane, or other lanes within a particular roadway or other travel way or one or more boundary markings associated therewith); traffic control data (e.g., the location and instructions of signage, traffic lights, or other traffic control devices); obstruction information (e.g., temporary or permanent blockages, etc.); event data (e.g., road closures/traffic rule alterations due to parades, concerts, sporting events, etc.); nominal vehicle path data (e.g., indicative of an ideal vehicle path such as along the center of a certain lane, etc.); or any other map data that provides information that assists the vehicle computing system 210 in processing, analyzing, and perceiving its surrounding environment and its relationship thereto. In some implementations, the map data 260 can include high definition map data. In some implementations, the map data 260 can include sparse map data indicative of a limited number of environmental features (e.g., lane boundaries, etc.). In some implementations, the map data can be limited to geographic area(s) or operating domains in which the vehicle 205 (or autonomous vehicles generally) may travel (e.g., due to legal/regulatory constraints, autonomy capabilities, or other factors).

The vehicle 205 can include a positioning system 265. The positioning system 265 can determine a current position of the vehicle 205. This can help the vehicle 205 localize itself within its environment. The positioning system 265 can be any device or circuitry for analyzing the position of the vehicle 205. For example, the positioning system 265 can determine position by using one or more of inertial sensors (e.g., inertial measurement unit(s), etc.), a satellite positioning system, based on IP address, by using triangulation or proximity to network access points or other network components (e.g., cellular towers, Wi-Fi access points, etc.) or other suitable techniques. The position of the vehicle 205 can be used by various systems of the vehicle computing system 210 or provided to a remote computing system. For example, the map data 260 can provide the vehicle 205 relative positions of the elements of a surrounding environment of the vehicle 205. The vehicle 205 can identify its position within the surrounding environment (e.g., across six axes, etc.) based at least in part on the map data 260. For example, the vehicle computing system 210 can process the sensor data 255 (e.g., LIDAR data, camera data, etc.) to match it to a map of the surrounding environment to get an understanding of the vehicle's position within that environment. Data indicative of the vehicle's position can be stored, communicated to, or otherwise obtained by the autonomy computing system 240.

The autonomy computing system 240 can perform various functions for autonomously operating the vehicle 205. For example, the autonomy computing system 240 can perform functions within the following systems: a perception system 270A, a prediction system 270B, and a motion planning system 270C. For example, the autonomy computing system 240 can obtain the sensor data 255 through the sensor(s) 235, process the sensor data 255 (or other data) to perceive its surrounding environment, predict the motion of objects within the surrounding environment, and generate an appropriate motion plan through such surrounding environment. In some implementations, these autonomy functions can be performed by one or more sub-systems such as, for example, perception system 270A, prediction system 270B, a motion planning system 270C, or other systems that cooperate to perceive the surrounding environment of the vehicle 205 and determine a motion plan for controlling the motion of the vehicle 205 accordingly. In some implementations, one or more functions of the perception system 270A, prediction system 270B, or motion planning system 270C can be performed by (or combined into) the same system or through shared computing resources. In some implementations, one or more of these functions can be performed through different sub-systems. As further described herein, the autonomy computing system 240 can communicate with the one or more vehicle control systems 250 to operate the vehicle 205 according to the motion plan (e.g., through the vehicle interface 245, etc.).

The vehicle computing system 210 (e.g., the autonomy computing system 240) can identify one or more objects that are within the surrounding environment of the vehicle 205 based at least in part on the sensor data 255 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The vehicle computing system 210 (e.g., performing perception functions, using a perception system 270A, etc.) can process the sensor data 255, the map data 260, etc. to obtain perception data 275A. The vehicle computing system 210 can generate perception data 275A that is indicative of one or more states (e.g., current or past state(s)) of one or more objects that are within a surrounding environment of the vehicle 205. For example, the perception data 275A for each object can describe (e.g., for a given time, time period) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The vehicle computing system 210 can utilize one or more algorithms or machine-learned model(s) that are configured to identify object(s) based at least in part on the sensor data 255. This can include, for example, one or more neural networks trained to identify object(s) within the surrounding environment of the vehicle 205 and the state data associated therewith. According to example aspects of the present disclosure, the machine-learned model(s) can be compressed to reduce computing resource requirements to store and/or deploy the model(s). The perception data 275A can be utilized for the prediction functions of prediction system 270B of the autonomy computing system 240.

The vehicle computing system 210 can be configured to predict a motion of the object(s) within the surrounding environment of the vehicle 205. For instance, the vehicle computing system 210 can generate prediction data 275B associated with such object(s). The prediction data 275B can be indicative of one or more predicted future locations of each respective object. For example, the prediction system 270B can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of way points. In some implementations, the prediction data 275B can be indicative of the speed or acceleration at which the respective object is predicted to travel along its associated predicted motion trajectory. The vehicle computing system 210 can utilize one or more algorithms or machine-learned model(s) that are configured to predict the future motion of object(s) based at least in part on the sensor data 255, the perception data 275A, map data 260, or other data. This can include, for example, one or more neural networks trained to predict the motion of the object(s) within the surrounding environment of the vehicle 205 based at least in part on the past or current state(s) of those objects as well as the environment in which the objects are located (e.g., the lane boundary in which it is travelling, etc.). According to example aspects of the present disclosure, the machine-learned model(s) can be compressed to reduce computing resource requirements to store and/or deploy the model(s). The prediction data 275B can be utilized for the motion planning functions of motion planning system 270C of the autonomy computing system 240.

The vehicle computing system 210 can determine a motion plan for the vehicle 205 based at least in part on the perception data 275A, the prediction data 275B, or other data. For example, the vehicle computing system 210 can generate motion planning data 275C indicative of a motion plan. The motion plan can include vehicle actions (e.g., speed(s), acceleration(s), other actions, etc.) with respect to one or more of the objects within the surrounding environment of the vehicle 205 as well as the objects' predicted movements. The motion plan can include one or more vehicle motion trajectories that indicate a path for the vehicle 205 to follow. A vehicle motion trajectory can be of a certain length or time range. A vehicle motion trajectory can be defined by one or more way points (with associated coordinates). The planned vehicle motion trajectories can indicate the path the vehicle 205 is to follow as it traverses a route from one location to another. Thus, the vehicle computing system 210 can take into account a route/route data when performing the motion planning functions of motion planning system 270C.

The vehicle computing system 210 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 210 can determine that the vehicle 205 can perform a certain action (e.g., pass an object, etc.) without increasing the potential risk to the vehicle 205 or violating any traffic laws (e.g., speed limits, lane boundaries, signage, etc.). For instance, the vehicle computing system 210 can evaluate the predicted motion trajectories of one or more objects during its cost data analysis to help determine an optimized vehicle trajectory through the surrounding environment. The motion planning system 270C can generate cost data associated with such trajectories. In some implementations, one or more of the predicted motion trajectories or perceived objects may not ultimately change the motion of the vehicle 205 (e.g., due to an overriding factor). In some implementations, the motion plan may define the vehicle's motion such that the vehicle 205 avoids the object(s), reduces speed to give more leeway to one or more of the object(s), proceeds cautiously, performs a stopping action, passes an object, queues behind/in front of an object, etc.

The vehicle computing system 210 can be configured to continuously update the vehicle's motion plan and corresponding planned vehicle motion trajectories. For example, in some implementations, the vehicle computing system 210 can generate new motion planning data 275C/motion plan(s) for the vehicle 205 (e.g., multiple times per second, etc.). Each new motion plan can describe a motion of the vehicle 205 over the next planning period (e.g., next several seconds, etc.). Moreover, a new motion plan may include a new planned vehicle motion trajectory. Thus, in some implementations, the vehicle computing system 210 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 205.

The vehicle computing system 210 can cause the vehicle 205 to initiate a motion control in accordance with at least a portion of the motion planning data 275C. A motion control can be an operation, action, etc. that is associated with controlling the motion of the vehicle 205. For instance, the motion planning data 275C can be provided to the vehicle control system(s) 250 of the vehicle 205. The vehicle control system(s) 250 can be associated with a vehicle interface 245 that is configured to implement a motion plan.

The vehicle interface 245 can serve as an interface/conduit between the autonomy computing system 240 and the vehicle control systems 250 of the vehicle 205 and any electrical/mechanical controllers associated therewith. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 205 "X" degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 205 to autonomously travel within the vehicle's surrounding environment.

The vehicle computing system 210 can store other types of data. For example, an indication, record, or other data indicative of the state of the vehicle (e.g., its location, motion trajectory, health information, etc.), the state of one or more users (e.g., passengers, operators, etc.) of the vehicle, or the state of an environment including one or more objects (e.g., the physical dimensions or appearance of the one or more objects, locations, predicted motion, etc.) can be stored locally in one or more memory devices of the vehicle 205. Additionally, the vehicle 205 can communicate data indicative of the state of the vehicle, the state of one or more passengers of the vehicle, or the state of an environment to a computing system that is remote from the vehicle 205, which can store such information in one or more memories remote from the vehicle 205. Moreover, the vehicle 205 can provide any of the data created or store onboard the vehicle 205 to another vehicle.

The vehicle computing system 210 can include the one or more vehicle user devices 280. For example, the vehicle computing system 210 can include one or more user devices with one or more display devices located onboard the vehicle 205. A display device (e.g., screen of a tablet, laptop, or smartphone) can be viewable by a user of the vehicle 205 that is located in the front of the vehicle 205 (e.g., driver's seat, front passenger seat). Additionally, or alternatively, a display device can be viewable by a user of the vehicle 205 that is located in the rear of the vehicle 205 (e.g., a back passenger seat). The user device(s) associated with the display devices can be any type of user device such as, for example, a table, mobile phone, laptop, etc. The vehicle user device(s) 280 can be configured to function as human-machine interfaces. For example, the vehicle user device(s) 280 can be configured to obtain user input, which can then be utilized by the vehicle computing system 210 or another computing system (e.g., a remote computing system, etc.). For example, a user (e.g., a passenger for transportation service, a vehicle operator, etc.) of the vehicle 205 can provide user input to adjust a destination location of the vehicle 205. The vehicle computing system 210 or another computing system can update the destination location of the vehicle 205 and the route associated therewith to reflect the change indicated by the user input.

As described herein, with reference to the remaining figures, the autonomy computing system 240 can utilize one or more machine-learned models to perform the functions of perception system 270A, prediction system 270B, or motion planning system 270C. According to example aspects of the present disclosure, the machine-learned model(s) can be compressed to reduce computing resource requirements to store and/or deploy the model(s). The machine-learned model(s) can be previously trained through one or more machine-learned techniques. The machine-learned models can be previously trained by the one or more remote computing system(s) 290B, the operations computing system 290A, or any other device (e.g., remote servers, training computing systems, etc.) remote from or onboard the vehicle 205. For example, the one or more machine-learned models can be learned by a training computing system (e.g., the operations computing system 290A, etc.) over training data stored in a training database. The training data can include sequential multi-modal sensor data indicative of a plurality of environments at different time steps. In some implementations, the training data can include a plurality of environments previously recorded by the autonomous vehicle with dynamic objects removed.

Figure 3:
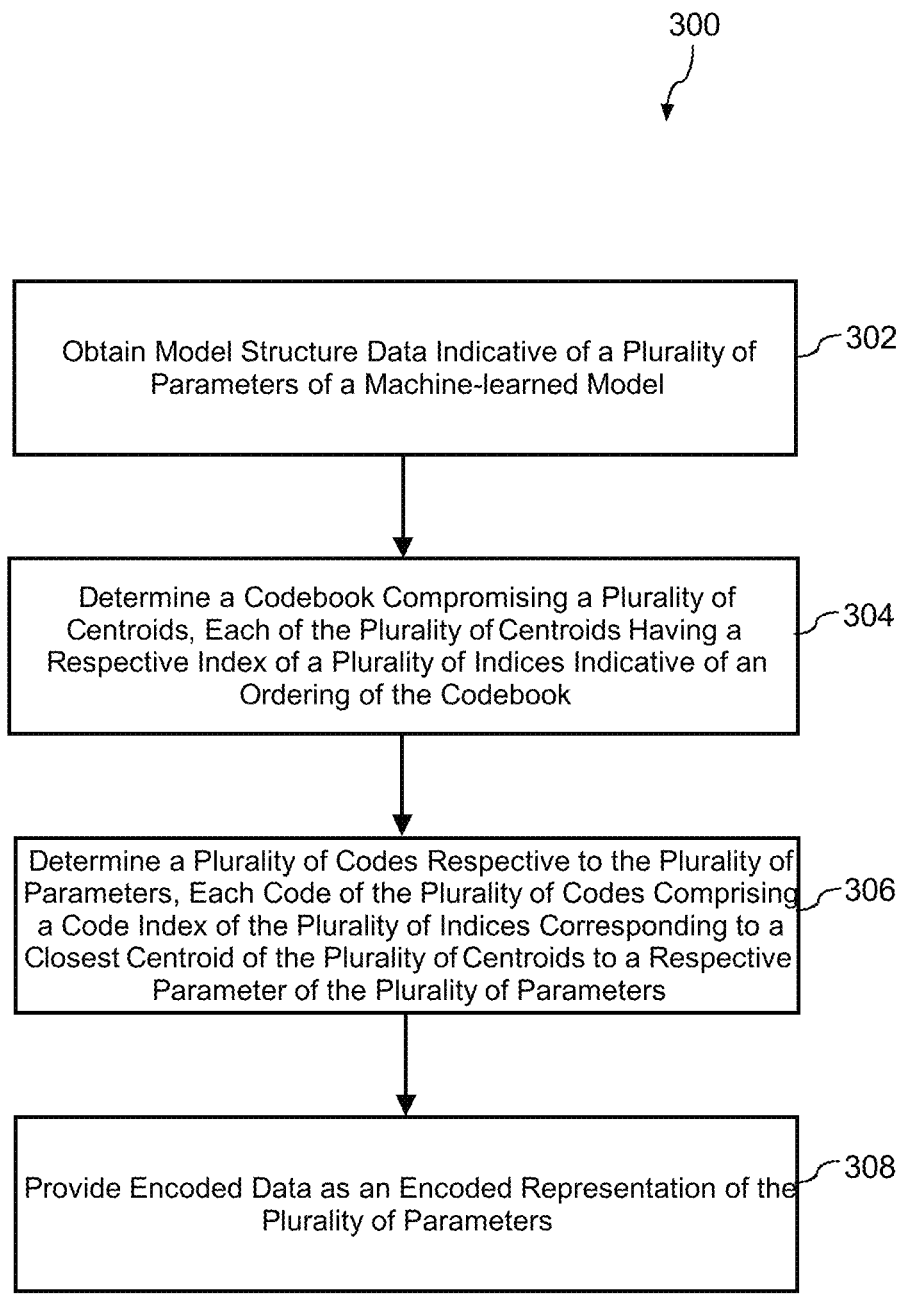
FIG. 3 depicts a flowchart of a method for compressing a machine-learned model according to aspects of the present disclosure.

FIG. 3 depicts a flowchart of a method 300 for compressing machine-learned model(s) according to aspects of the present disclosure. One or more portion(s) of the method 300 can be implemented by a computing system that includes one or more computing devices such as, for example, the computing systems described with reference to the other figures (e.g., robotic platform 105, vehicle computing system 210, operations computing system(s) 290A, remote computing system(s) 290B, etc.). Each respective portion of the method 300 can be performed by any (or any combination) of one or more computing devices. Moreover, one or more portion(s) of the method 300 can be implemented as an algorithm on the hardware components of the device(s) described herein (e.g., as in FIGS. 1, 2, 6, etc.), for example, to compress machine-learned model(s). FIG. 3 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 3 is described with reference to elements/terms described with respect to other systems and figures for exemplary illustrated purposes and is not meant to be limiting. One or more portions of method 300 can be performed additionally, or alternatively, by other systems.

At 302, the method 300 can include obtaining model structure data indicative of a plurality of parameters of a machine-learned model. The model structure data can be descriptive of at least a portion of the machine-learned model, such as data used in constructing the machine-learned model. In some implementations, the machine-learned model can include one or more layers. For instance, in some implementations, the machine-learned model can be a neural network, such as a deep neural network, a convolutional neural network (CNN), a recursive neural network (RNN), and/or any other suitable type of neural network. The neural network can include one or more layers.

In some implementations, the plurality of parameters can be or can include a plurality of weights of at least one layer of the machine-learned model. For instance, in some implementations, the plurality of parameters can include weights of exactly one layer of the machine-learned model. As another example, in some implementations, the plurality of parameters can include weights of two or more layers, each layer of the machine-learned model, or other suitable number of layers. The at least one layer can be or can include any suitable type of layer, such as, for example, fully-connected (FC) layer(s), convolutional layer(s), or other suitable types of layer(s). In some implementations, the plurality of weights can be represented as a weight matrix of the at least one layer.

As one example, in some implementations, the at least one layer can be or can include a fully-connected layer. The parameters of the machine-learned model can include a plurality of weights of the fully-connected layer. For instance, the plurality of weights can include weights of connections (e.g., activations) from a prior layer in the machine-learned model to the fully connected layer. The weights of the fully-connected layer can be represented as a weight matrix $W \in \mathbb{R}^{m \times n}$:

$$W = \begin{bmatrix} w_{1,1} & \cdots & w_{1,n} \\ \vdots & \ddots & \vdots \\ w_{m,1} & \cdots & w_{m,n} \end{bmatrix}$$

The weight matrix can include a plurality of subvectors. At least some of the subvectors can include a block of contiguous scalars in a column of the weight matrix. For instance, in some implementations, the weight matrix can be divided into subvectors based at least in part on a subvector length d. The subvector length d can be any suitable integer that divides into the number of matrix rows m. For instance, the subvector $w_{i,j}$ can be the vector obtained from the i-th block of d contiguous scalars in the j-th column of the weight matrix W. The set $\{w_{i,j}\}$ can thus be a collection of d-dimensional blocks that can be used to construct the weight matrix W.

As another example, in some implementations, the at least one layer can be or can include a convolutional layer. The plurality of weights can include weights of a convolutional kernel. For instance, in some implementations, a weight matrix of a convolutional layer can have dimensions according to parameters of the convolutional kernel, such as a first dimension corresponding to the number of input channels, a second dimension corresponding to the number of output channels, and/or one or more dimensions corresponding to kernel size. For instance, one example convolutional layer weight matrix for a convolutional layer with $C_{in}$ input channels, $C_{out}$ output channels, and a convolutional kernel of size K×K is mathematically represented by $W \in \mathbb{R}^{C_{in} \times C_{out} \times K \times K}$. In some implementations, the weight matrix (e.g., for a convolutional layer) can be reshaped into a two-dimensional matrix. For instance, the weight matrix for a convolutional layer can be reshaped such that the reshaped weight matrix can be encoded similarly to a weight matrix of a fully-connected layer. As one example, the weight matrix can be reshaped into a two-dimensional matrix of size $C_{in}K^2 \times C_{out}$. An inverse of the reshaping operation can be applied when decoding the reshaped weight matrix.

Additionally and/or alternatively, at 304, the method 300 can include determining a codebook including a plurality of centroids. The plurality of centroids can have a respective index of a plurality of indices indicative of an ordering of the codebook. For instance, the codebook can include an ordered set of centroids, where each centroid is denoted in the ordered set by the respective index. For instance, the centroid(s) can have values that are learned to quantize the parameters of the machine-learned model. The codebook (e.g., the set of centroids) can be a smaller set than that of the model parameters. For example, if the model parameters are or include a weight matrix (e.g., having dimensions m×n) then the length of the codebook k can be less than mn.

The length of the codebook can be varied according to a desired compression rate. For example, in some cases, longer codebooks may more accurately quantize the model parameters, thereby decreasing quantization error, at the cost of requiring more memory and/or other computing resources to store and/or otherwise utilize. In some implementations, the codebook can be a lookup table.

Additionally and/or alternatively, at 306, the method can include determining a plurality of codes respective to the plurality of parameters. The plurality of codes can respectively include a code index of the plurality of indices corresponding to a closest centroid of the plurality of centroids to a respective parameter of the plurality of parameters. For instance, for at least one parameter of the machine-learned model, such as at least one weight and/or at least one subvector of a weight matrix, the at least one parameter can have a closest centroid in the codebook. The closest centroid to the respective parameter can be closest to the respective parameter in Euclidean distance. The closest centroid can be denoted within the codebook by a code index. The plurality of codes can be or can include the code index of the closest centroid(s) for some or all of the plurality of parameters. The plurality of codes can be respective to the plurality of parameters, such as the plurality of subvectors. As an example, each parameter of the model (e.g., each weight and/or each subvector) can be "replaced" in the plurality of parameters by the code index of the parameter's respective closest centroid in the codebook. A parameter of the plurality of parameters can thus be closely approximated with reference to the value of the respective closest centroid indicated by the code index of the respective code. In some implementations, the codebook can be or can include a lookup table including the one or more centroids, and the code index for the respective parameter indexes the closest centroid in the lookup table.

In some implementations, the subvectors of the weight matrix (e.g., of at least one layer) can be approximated by the codebook, where the codebook is a smaller set than the subvectors, $\mathcal{C} = \{c(1), \ldots, c(k)\} \subseteq \mathbb{R}^d$, where k<<mn. The elements of $\mathcal{C}$, $c(1), \ldots, c(k)$ can be the centroids. The size of the codebook, k, can be varied based on the desired compression rate. Let $b_{i,j}$ be the code index of an element in $\mathcal{C}$ (e.g., a closest centroid) that is closest to an element of the weight matrix indexed by i and j (e.g., a subvector $w_{i,j}$). The closest centroid can be closest to the element of the weight matrix in Euclidean distance. For example, in some implementations, $$b_{i,j} = \underset{t}{\operatorname{argmin}} \|w_{i,j} - c(t)\|_2^2.$$

An approximated weight matrix $\hat{W}$ of the weight matrix W can thus be obtained with each subvector $w_{i,j}$ being replaced by the closest centroid indexed by the code index, $c(b_{i,j})$. Intuitively, if the closest centroid $c(b_{i,j})$ is learned to be sufficiently close to $w_{i,j}$ for some or all subvectors in the weight matrix, then the approximated weight matrix should be sufficiently close to the weight matrix. Furthermore, a machine-learned model (e.g., a neural network) constructed according to the approximated weight matrix should thus be sufficiently close to the model of the weight matrix. An encoding of the model can thus be created from the components needed to create the approximated weight matrix, such as the codebook and the code index/indices for some or all (e.g., each) subvector(s). For instance, an encoding $\mathcal{B}$ of the weight matrix W can be the pair (B, $\mathcal{C}$) where B is the $$\left(\text{e.g., } \frac{m}{d} \times n\right)$$

matrix of code indices respective to the subvectors in W. This encoding $\mathcal{B}$ can be significantly smaller than the weight matrix itself. The encoding $\mathcal{B}$ can be decoded by replacing each code index in B with the value of the centroid in the codebook $\mathcal{C}$ indexed by the code index.

Additionally and/or alternatively, at 308, the method 300 can include providing encoded data as an encoded representation of the plurality of parameters of the machine-learned model. The encoded data can include the codebook and the plurality of codes. For instance, the codebook and the plurality of codes can be stored and/or deployed in place of the plurality of parameters. The encoded data can be deployed to a computing platform (e.g., an autonomous vehicle) on which the machine-learned model is to be used, and the model can be recreated from the encoded data. In some implementations, the method can further include detecting one or more objects in an environment using the encoded representation of the plurality of parameters of the machine-learned model. For instance, a model reconstructed from the encoded representation can be used for object detection and/or any other suitable machine-learning task. As one example, the model reconstructed from the encoded representation can be used in operating an autonomous vehicle.

For instance, the method 300 can be implemented to learn the encoded data (e.g., of one or more layers of a machine-learned model) such that the final output of the model is preserved across some or all (e.g., most) inputs. In some implementations, determining the codebook comprising the plurality of centroids can include learning the plurality of centroids simultaneously with the plurality of codes. For instance, the centroids and/or codes can be learned to optimize (e.g., minimize) a reconstruction error between the plurality of parameters and an approximated plurality of parameters that is reconstructed from the encoded data. As one example, in some implementations, the codebook including the plurality of centroids and/or the codes can be initialized by optimizing (e.g., minimizing) a difference between the plurality of parameters and the plurality of centroids. For example, the initial values of the plurality of centroids can be selected such that the total distance between the plurality of parameters and their respective closest centroids is optimized (e.g., minimized) over the set of parameters. In some implementations, the values of the centroids and/or the codebook can further be fine-tuned from their initial values by optimizing (e.g., minimizing) a loss function (e.g., by gradient-based optimization) over a training set. As one example, the training set can be the set of the plurality of parameters (e.g., the subvectors).

For instance, in one example implementation, each layer of the machine-learned model can be encoded independently. The layer(s) can be encoded by optimizing (e.g., minimizing) the distance (e.g., Euclidean distance) between the approximated weight matrix $\hat{W}$ and original weight matrix W. For instance, the encoding $\mathcal{B}$ (e.g., the codes B and/or the codebook $\mathcal{C}$) can be learned to optimize (e.g., minimize) a reconstruction error, such as the $l_2$ reconstruction error $$E = \min_{\mathbf{B}, \mathcal{C}} \| W - \hat{W} \|^2 = \min_{\mathbf{B}, \mathcal{C}} \sum_{i,j} \| w_{i,j} - c(b_{i,j}) \|_2^2.$$

This reconstruction error can be the k-means objective when the plurality of parameters (e.g., the subvectors $\{w_{i,j}\}$) from the training set. This reconstruction can have a direct impact on the reconstructed model's accuracy.

In some implementations, the reconstruction error can be optimized by minimizing a covariance of the plurality of parameters. For instance, in some cases, it can be assumed that the parameters (e.g., subvectors, weights, etc.) that serve as the input to the k-means problem follow a Gaussian distribution with zero mean and a covariance $\Sigma_{WW} \in \mathbb{R}^{d \times d}$, or $w_{i,j} \sim \mathcal{N}(0, \Sigma_{WW})$. In this case, the reconstruction error E can be bounded by the determinant of the covariance of the plurality of parameters (e.g., the covariance of the subvectors of the weight matrix), or $$E \leq k^{-\frac{2}{d}} d \left| \sum_{ww} \right|^{\frac{1}{d}}.$$

For at least this case, it can be assumed that k-means acts as a good minimizer such that this bound is at least close to the reconstruction error achieved by a k-means algorithm.

In some implementations, subsequent to initialization of the plurality of codes and the codebook, the plurality of codes and the codebook can be iteratively updated with random noise over one or more update iterations. For instance, the k-means algorithm can be annealed by scheduling a perturbation such that covariance of the training set decreases over time. This can be achieved by adding noise, such as noise sampled from a Gaussian distribution with diagonal covariance, to the training set.

As one example, after (e.g., randomly) initializing the codes and/or the codebook, the codes and/or the codebook can be iteratively updated according to one or more rules. As one example, a first rule can be a noisy codebook update $$\mathcal{C} \leftarrow \operatorname*{argmin}_{\mathcal{C}} \sum_{i,j} \| \psi(w_{i,j}, t) - c(b_{i,j}) \|_2^2.$$

Additionally and/or alternatively, a second rule can be a standard code update $$B \leftarrow \operatorname*{argmin}_{B} \sum_{i,j} \| w_{i,j} - c(b_{i,j}) \|_2^2.$$

In these rules, t can denote an iteration number. Additionally and/or alternatively, $\psi(x,t) \rightarrow x + T(t) \cdot \varepsilon$ denotes adding noise $\varepsilon$ to x according to a noise schedule $T(t)$ In some implementations, the noise can be sampled from a zero-mean Gaussian distribution $\varepsilon \sim \mathcal{N}(0, \operatorname{diag}(\Sigma_{WW}))$ where $\operatorname{diag}(\Sigma_{WW})$ is a diagonal matrix with the standard deviation of the layer weights. In some implementations, the noise can be decayed according to the schedule $$T(t) \rightarrow \left(1 - \left(\frac{t}{I}\right)\right)^{\gamma}$$

where I is the total number of iterations and $\gamma$ is a decay parameter (e.g., 0.5).

In some cases, encoding each layer independently in this manner can contribute to accumulating errors in activations. To solve this, in some implementations, the encoding can be fine-tuned after this initialization to recover the original accuracy of the model. As one example, after initializing the codebook and/or the codes, the codes can be fixed such that the codes are no longer updated. The original training set (e.g., $\{w_{i,j}\}$) can be used to fine-tune the centroids of the codebook with gradient-based learning. As one example, the centroids can be fine-tuned by:

$$c(i) \leftarrow c(i) - g\left(\frac{\partial \mathcal{L}}{\partial c(i)}, \phi\right),$$

where $\mathcal{L}$ is a loss function of the model that is differentiable with respect to the centroids and g (x,y) is an update rule (e.g., Adam, SGD, RMSProp, etc.) with one or more hyperparameters $\phi$. For instance, the hyperparameter(s) can be or can include learning rate, momentum, decay rate, etc.

Figure 4:
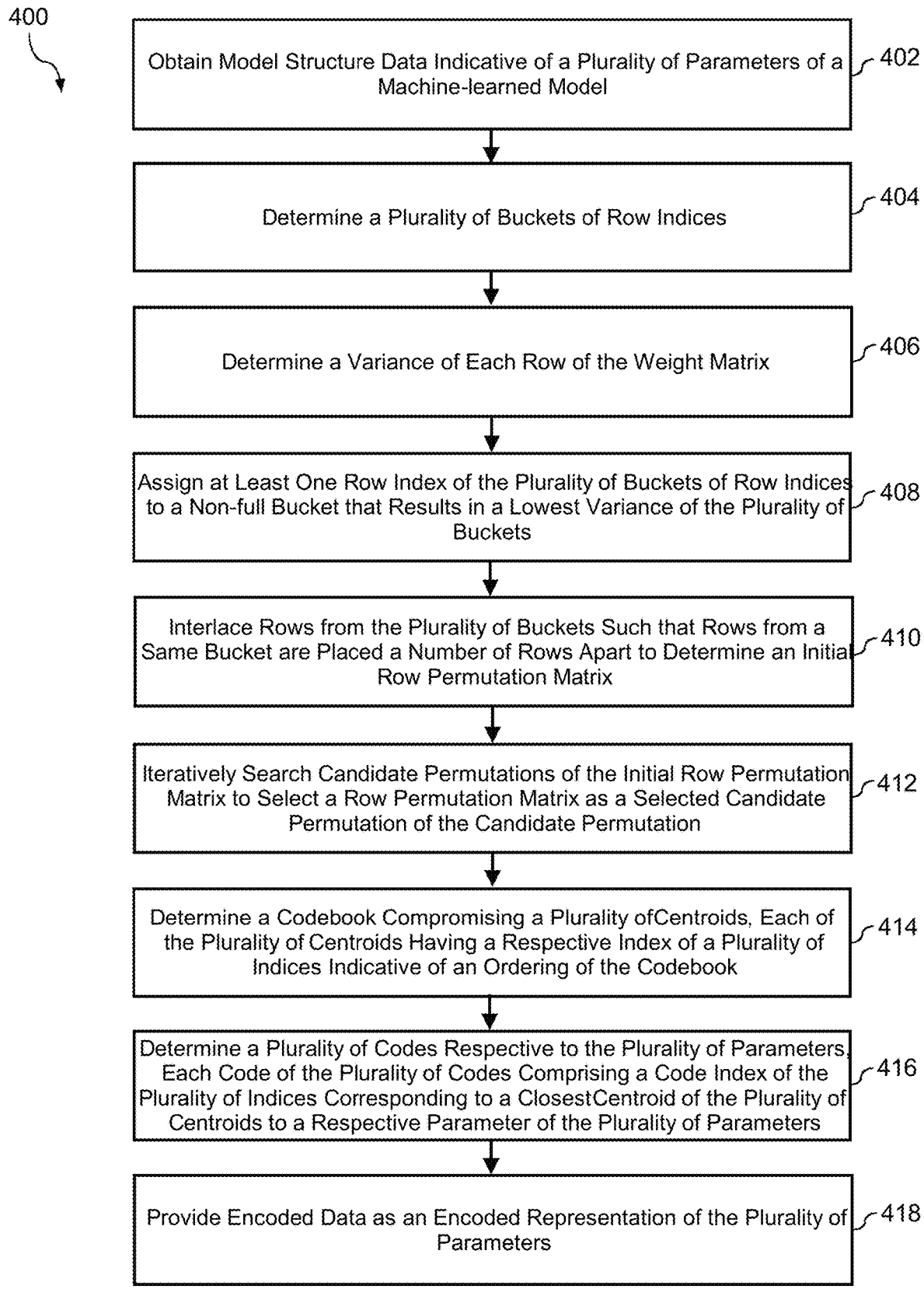
FIG. 4 depicts a flowchart of a method for compressing a machine-learned model according to aspects of the present disclosure.
Figure 5:
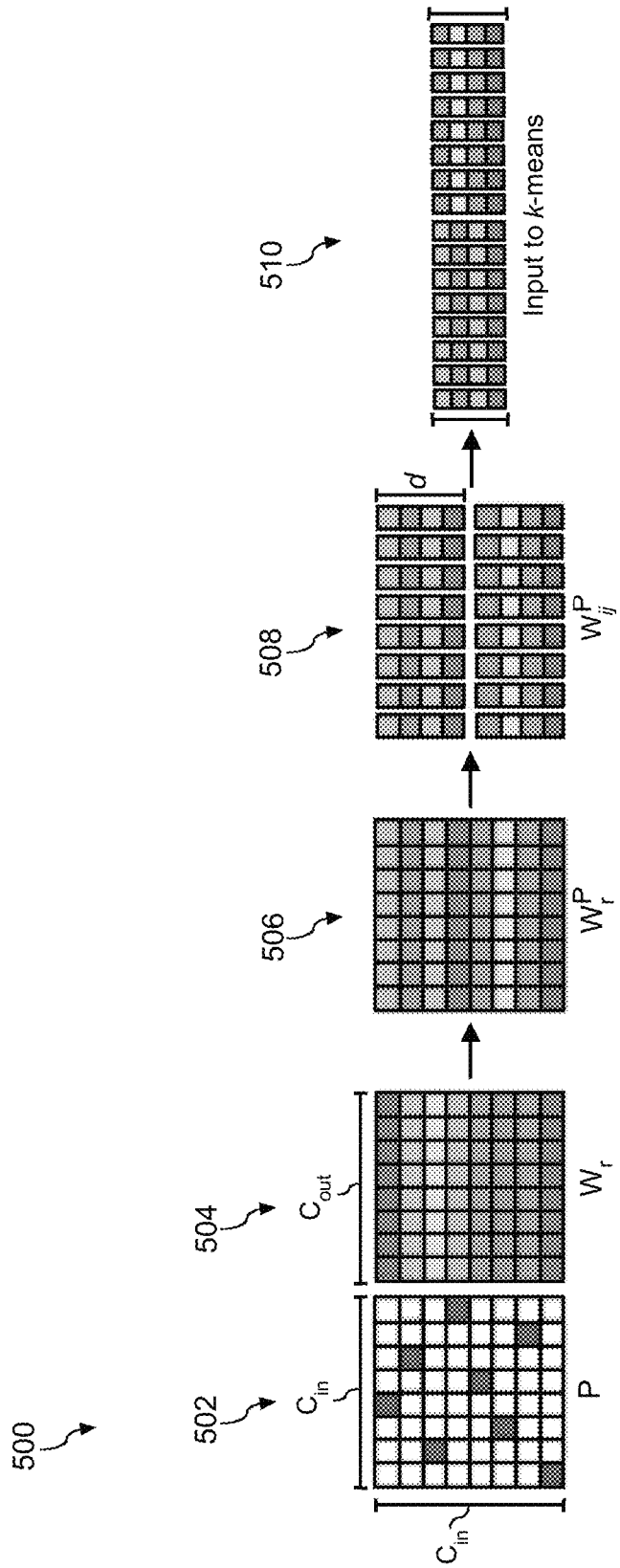
FIG. 5 depicts an example data flow diagram for permuting a weight matrix according to aspects of the present disclosure.

FIG. 4 depicts a flowchart of a method 400 for compressing machine-learned model(s) according to aspects of the present disclosure. One or more portion(s) of the method 400 can be implemented by a computing system that includes one or more computing devices such as, for example, the computing systems described with reference to the other figures (e.g., robotic platform 105, vehicle computing system 210, operations computing system(s) 290A, remote computing system(s) 290B, etc.). Each respective portion of the method 400 can be performed by any (or any combination) of one or more computing devices. Moreover, one or more portion(s) of the method 400 can be implemented as an algorithm on the hardware components of the device(s) described herein (e.g., as in FIGS. 1, 2, 6, etc.), for example, to compress machine-learned model(s). FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 4 is described with reference to elements/terms described with respect to other systems and figures for exemplary illustrated purposes and is not meant to be limiting. One or more portions of method 400 can be performed additionally, or alternatively, by other systems.

At 402, the method 400 can include obtaining model structure data indicative of a plurality of parameters of a machine-learned model. The model structure data can be descriptive of at least a portion of the machine-learned model, such as data used in constructing the machine-learned model. In some implementations, the machine-learned model can include one or more layers. For instance, in some implementations, the machine-learned model can be a neural network, such as a deep neural network, a convolutional neural network (CNN), a recursive neural network (RNN), and/or any other suitable type of neural network. The neural network can include one or more layers.

In some implementations, the plurality of parameters can be or can include a plurality of weights of at least one layer of the machine-learned model. For instance, in some implementations, the plurality of parameters can include weights of exactly one layer of the machine-learned model. As another example, in some implementations, the plurality of parameters can include weights of two or more layers, each layer of the machine-learned model, or other suitable number of layers. The at least one layer can be or can include any suitable type of layer, such as, for example, fully-connected (FC) layer(s), convolutional layer(s), or other suitable types of layer(s). In some implementations, the plurality of weights can be represented as a weight matrix of the at least one layer.

As one example, in some implementations, the at least one layer can be or can include a fully-connected layer. The parameters of the machine-learned model can include a plurality of weights of the fully-connected layer. For instance, the plurality of weights can include weights of connections (e.g., activations) from a prior layer in the machine-learned model to the fully connected layer. The weights of the fully-connected layer can be represented as a weight matrix $W \in \mathbb{R}^{m \times n}$:

$$W = \begin{bmatrix} w_{1,1} & \cdots & w_{1,n} \\ \vdots & \ddots & \vdots \\ w_{m,1} & \cdots & w_{m,n} \end{bmatrix}$$

The weight matrix can include a plurality of subvectors. At least some of the subvectors can include a block of contiguous scalars in a column of the weight matrix. For instance, in some implementations, the weight matrix can be divided into subvectors based at least in part on a subvector length d. The subvector length d can be any suitable integer that divides into the number of matrix rows m. For instance, the subvector $w_{i,j}$ can be the vector obtained from the i-th block of d contiguous scalars in the j-th column of the weight matrix W. The set $\{w_{i,j}\}$ can thus be a collection of d-dimensional blocks that can be used to construct the weight matrix W.

As another example, in some implementations, the at least one layer can be or can include a convolutional layer. The plurality of weights can include weights of a convolutional kernel. For instance, in some implementations, a weight matrix of a convolutional layer can have dimensions according to parameters of the convolutional kernel, such as a first dimension corresponding to the number of input channels, a second dimension corresponding to the number of output channels, and/or one or more dimensions corresponding to kernel size. For instance, one example convolutional layer weight matrix for a convolutional layer with $C_{in}$ input channels, $C_{out}$ output channels, and a convolutional kernel of size K×K is mathematically represented by $W \in \mathbb{R}^{C_{in} \times C_{out} \times K \times K}$. In some implementations, the weight matrix (e.g., for a convolutional layer) can be reshaped into a two-dimensional matrix. For instance, the weight matrix for a convolutional layer can be reshaped such that the reshaped weight matrix can be encoded similarly to a weight matrix of a fully-connected layer. As one example, the weight matrix can be reshaped into a two-dimensional matrix of size $C_{in}K^2 \times C_{out}$. An inverse of the reshaping operation can be applied when decoding the reshaped weight matrix.

According to example aspects of the present disclosure, the weight matrix can be permuted from an initial ordering of the weight matrix. For instance, the weight matrix can be permuted by a row permutation matrix. As one example, the weight matrix can be multiplied by the row permutation matrix to produce a permuted weight matrix. The weight matrix can be permuted such that the resulting permuted weight matrix is easier to quantize (e.g., can be quantized more accurately) than the original nonpermuted weight matrix. In particular, the model (e.g., a convolutional neural network) may be invariant to permutations of the weight matrix. As one example, a convolutional neural network can be invariant to permutations of its weights as long as the same permutation is applied to output channels for parent layers and input channels for children layers. This permutation can be applied offline once, without necessarily affecting capacity or inference time of the convolutional neural network.

For instance, it can be an objective of permuting the weight matrix to find an equivalent model (e.g., an equivalent neural network) whose weights are easier to quantize. This is explained with reference to the data flow diagram 500 of FIG. 5. For example, let P be the row permutation matrix 502 associated with a permutation π. As one example, for a 1×1 convolutional layer, a weight matrix 504 ($W_r$), the row permutation matrix 502 (P) can be multiplied by the weight matrix 504 ($W_r$) to create a permuted weight matrix 506 such that $PW_r = W_r^P$ The permuted weight matrix 506 can include permuted weights and/or subvectors 508, $\{w_{i,j}^P\}$. Thus, the objective for learning the code and codebook can become $$\min_{P,B,C} \sum_{i,j} \|w_{i,j}^P - c(b_{i,j})\|_2^2.$$

This problem can be split into a first step of determining the row permutation matrix P and a second step of determining the codes and/or codebook. The permuted weights and/or subvectors 508 can be provided as input 510 to the k-means algorithm.

The method 400 can include determining the row permutation matrix such that a determinant of a covariance of the set of the plurality of weights (e.g., $\{w_{i,j}^P\}$) is optimized (e.g., minimized). For instance, in some implementations, the method 400 can include obtaining an initial row permutation matrix. The initial row permutation matrix can optimize a product of diagonal elements of the initial row permutational matrix. In some implementations, obtaining the initial row permutation matrix includes, at 404, determining a plurality of buckets of row indices. For instance, the method can include (e.g., greedily) obtaining an initial row permutation matrix that minimizes the product of the diagonal elements of the row permutation matrix by creating d buckets of row indices. Each bucket of row indices can have capacity to hold $C_{in}/d$ elements. In some implementations, obtaining the initial row permutation matrix includes, at 406, determining a variance of each row of the weight matrix. For instance, the variance of each row of the weight matrix $W_r$ can be determined. In some implementations, obtaining the initial row permutation matrix includes, at 408, assigning (e.g., greedily assigning) some or all (e.g., each) row index/indices of the plurality of buckets of row indices to a non-full bucket that results in a lowest variance of the plurality of buckets. In some implementations, obtaining the initial row permutation matrix includes, at 410, interlacing rows from the plurality of buckets such that rows from a same bucket are placed a number of rows apart, such as d rows apart.

The steps 404 through 410 can be greedy algorithms for initializing the row permutation matrix. Given the number of possible permutations of the weight matrix, greedy algorithms can have limitations on the quality of solution that can be reasonably found. Thus, in some implementations, the method 400 can include, at 412, iteratively searching a plurality of candidate permutations of the initial row permutation matrix to select the row permutation matrix as a selected candidate permutation of the plurality of candidate permutations based at least in part on a determinant of a covariance of the selected permutation. For instance, a new candidate permutation can be proposed by flipping one or more dimensions, such as d dimensions, from a current best solution. The flipped dimensions can be chosen arbitrarily (e.g., randomly). In an inner loop, the candidate permutation can be iteratively improved by flipping two dimensions (e.g., randomly-chosen dimension). The candidate permutation with two flipped dimensions can be kept as a new candidate permutation if it improves the quality of the selected permutation. For example, the candidate permutation with two flipped dimensions can be kept if it results in a dataset with a lower determinant of a covariance. The current best solution can be updated if the candidate permutation provides an improvement over the current best solution.

In some cases, each layer can have a single parent, so each layer can have a different $C_{in}$ permutation after applying the same permutation in $C_{out}$ to the parent of the layer. However, some networks, such as residual neural networks (e.g., ResNet) can include layers with multiple parents and/or siblings. For instance, residual connections can introduce additional constraints for network invariance under weight permutation. For instance, one constraint can be that all layers connecting to the residual can share the same permutation, in the appropriate dimension as either child or parent. In these cases, the permutation matrix can be optimized to reduce the average of the determinant of the covariances of multiple layers.

Additionally and/or alternatively, at 414, the method 400 can include determining a codebook including a plurality of centroids. The plurality of centroids can have a respective index of a plurality of indices indicative of an ordering of the codebook. For instance, the codebook can include an ordered set of centroids, where each centroid is denoted in the ordered set by the respective index. For instance, the centroid(s) can have values that are learned to quantize the parameters of the machine-learned model. The codebook (e.g., the set of centroids) can be a smaller set than that of the model parameters. For example, if the model parameters are or include a weight matrix (e.g., having dimensions m×n) then the length of the codebook k can be less than mn. The length of the codebook can be varied according to a desired compression rate. For example, in some cases, longer codebooks may more accurately quantize the model parameters, thereby decreasing quantization error, at the cost of requiring more memory and/or other computing resources to store and/or otherwise utilize. In some implementations, the codebook can be a lookup table.

Additionally and/or alternatively, at 416, the method can include determining a plurality of codes respective to the plurality of parameters. The plurality of codes can respectively include a code index of the plurality of indices corresponding to a closest centroid of the plurality of centroids to a respective parameter of the plurality of parameters. For instance, for at least one parameter of the machine-learned model, such as at least one weight and/or at least one subvector of a weight matrix, the at least one parameter can have a closest centroid in the codebook. The closest centroid to the respective parameter can be closest to the respective parameter in Euclidean distance. The closest centroid can be denoted within the codebook by a code index. The plurality of codes can be or can include the code index of the closest centroid(s) for some or all of the plurality of parameters. The plurality of codes can be respective to the plurality of parameters, such as the plurality of subvectors. As an example, each parameter of the model (e.g., each weight and/or each subvector) can be "replaced" in the plurality of parameters by the code index of the parameter's respective closest centroid in the codebook. A parameter of the plurality of parameters can thus be closely approximated with reference to the value of the respective closest centroid indicated by the code index of the respective code. In some implementations, the codebook can be or can include a lookup table including the one or more centroids, and the code index for the respective parameter indexes the closest centroid in the lookup table.

In some implementations, the subvectors of the weight matrix (e.g., of at least one layer) can be approximated by the codebook, where the codebook is a smaller set than the subvectors, $C = \{c(1), \ldots, c(k)\} \subseteq \mathbb{R}^d$, where k<<mn. The elements of $C$, $c(1), \ldots, c(k)$ can be the centroids. The size of the codebook, k, can be varied based on the desired compression rate. Let $b_{i,j}$ be the code index of an element in C (e.g., a closest centroid) that is closest to an element of the weight matrix indexed by i and j (e.g., a subvector $w_{i,j}$). The closest centroid can be closest to the element of the weight matrix in Euclidean distance. For example, in some implementations, $$b_{i,j} = \operatorname*{argmin}_t \|w_{i,j} - c(t)\|_2^2.$$

An approximated weight matrix $\hat{W}$ of the weight matrix W can thus be obtained with each subvector $w_{i,j}$ being replaced by the closest centroid indexed by the code index, $c(b_{i,j})$. Intuitively, if the closest centroid $c(b_{i,j})$ is learned to be sufficiently close to $w_{i,j}$ for some or all subvectors in the weight matrix, then the approximated weight matrix should be sufficiently close to the weight matrix. Furthermore, a machine-learned model (e.g., a neural network) constructed according to the approximated weight matrix should thus be sufficiently close to the model of the weight matrix. An encoding of the model can thus be created from the components needed to create the approximated weight matrix, such as the codebook and the code index/indices for some or all (e.g., each) subvector(s). For instance, an encoding $\mathcal{B}$ of the weight matrix W can be the pair $(B, \mathcal{C})$ where B is the $$\left(\text{e.g., } \frac{m}{d} \times n\right)$$

matrix of code indices respective to the subvectors in W. This encoding $\mathcal{B}$ can be significantly smaller than the weight matrix itself. The encoding $\mathcal{B}$ can be decoded by replacing each code index in B with the value of the centroid in the codebook C indexed by the code index.

Additionally and/or alternatively, at 418, the method 400 can include providing encoded data as an encoded representation of the plurality of parameters of the machine-learned model. The encoded data can include the codebook and the plurality of codes. For instance, the codebook and the plurality of codes can be stored and/or deployed in place of the plurality of parameters. The encoded data can be deployed to a computing platform (e.g., an autonomous vehicle) on which the machine-learned model is to be used, and the model can be recreated from the encoded data. In some implementations, the method can further include detecting one or more objects in an environment using the encoded representation of the plurality of parameters of the machine-learned model. For instance, a model reconstructed from the encoded representation can be used for object detection and/or any other suitable machine-learning task. As one example, the model reconstructed from the encoded representation can be used in operating an autonomous vehicle.

For instance, the method 400 can be implemented to learn the encoded data (e.g., of one or more layers of a machine-learned model) such that the final output of the model is preserved across some or all (e.g., most) inputs. In some implementations, determining the codebook comprising the plurality of centroids can include learning the plurality of centroids simultaneously with the plurality of codes. For instance, the centroids and/or codes can be learned to optimize (e.g., minimize) a reconstruction error between the plurality of parameters and an approximated plurality of parameters that is reconstructed from the encoded data. As one example, in some implementations, the codebook including the plurality of centroids and/or the codes can be initialized by optimizing (e.g., minimizing) a difference between the plurality of parameters and the plurality of centroids. For example, the initial values of the plurality of centroids can be selected such that the total distance between the plurality of parameters and their respective closest centroids is optimized (e.g., minimized) over the set of parameters. In some implementations, the values of the centroids and/or the codebook can further be fine-tuned from their initial values by optimizing (e.g., minimizing) a loss function (e.g., by gradient-based optimization) over a training set. As one example, the training set can be the set of the plurality of parameters (e.g., the subvectors).

Figure 6:
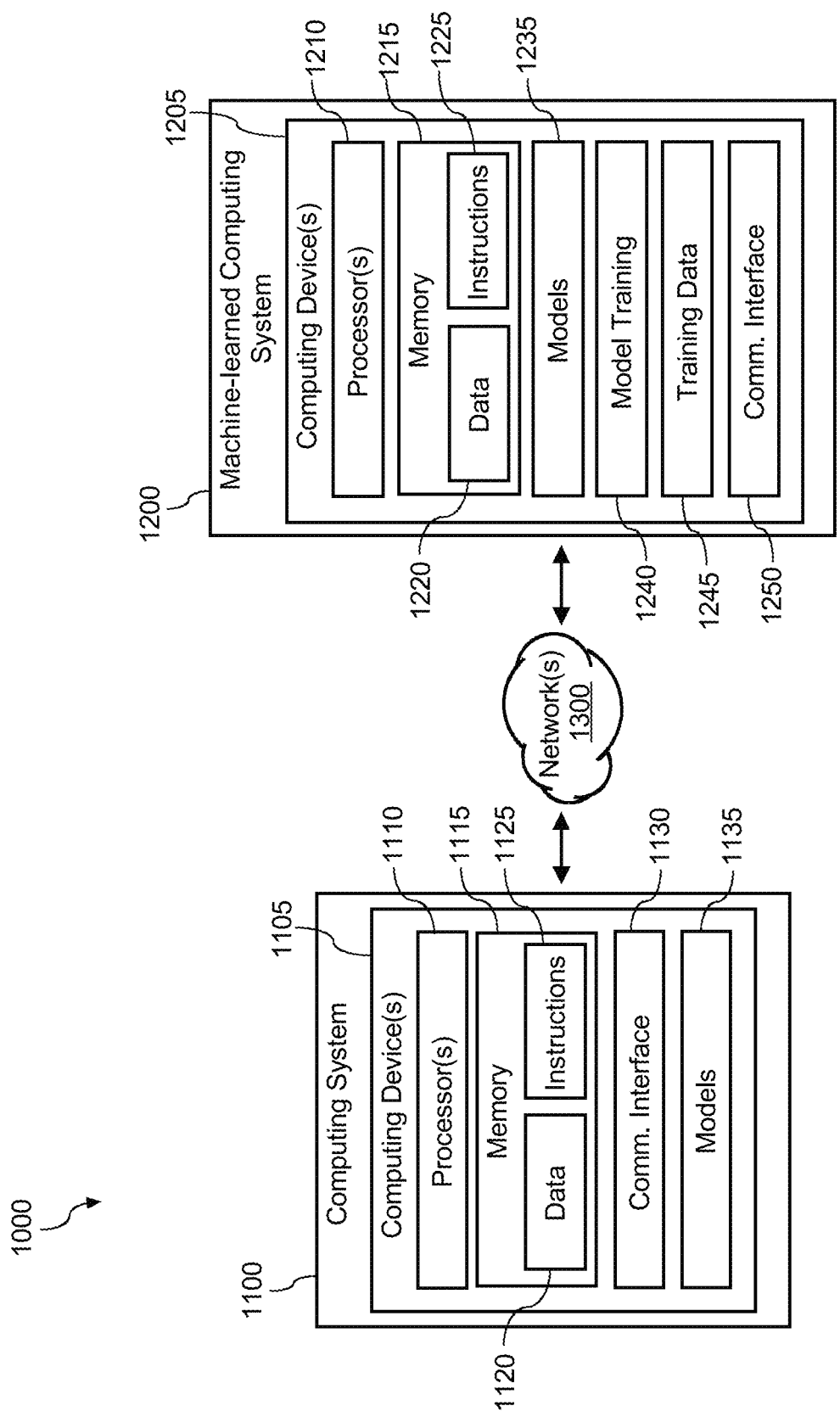
FIG. 6 depicts a block diagram of an example computing system according to example embodiments of the present disclosure.

FIG. 6 depicts a block diagram of an example computing system 1000 according to example embodiments of the present disclosure. The example computing system 1000 includes a computing system 1100 and a machine learning computing system 1200 that are communicatively coupled over one or more network(s) 1300.

In some implementations, the computing system 1100 can perform one or more observation tasks such as, for example, by obtaining multi-modal sensor data associated with an environment. In some implementations, the computing system 1100 can be included in a robotic platform. For example, the computing system 1100 can be on-board an autonomous vehicle. In other implementations, the computing system 1100 is not located on-board a robotic platform. The computing system 1100 can include one or more distinct physical computing devices 1105.

The computing system 1100 (or one or more computing device(s) 1105 thereof) can include one or more processors 1110 and a memory 1115. The one or more processors 1110 can be any suitable processing device (e.g., a processor core, a microprocessor, an ASIC, a FPGA, a controller, a microcontroller, etc.) and can be one processor or a plurality of processors that are operatively connected. The memory 1115 can include one or more non-transitory computer-readable storage media, such as RAM, ROM, EEPROM, EPROM, one or more memory devices, flash memory devices, etc., and combinations thereof.

The memory 1115 can store information that can be accessed by the one or more processors 1110. For instance, the memory 1115 (e.g., one or more non-transitory computer-readable storage mediums, memory devices) can store data 1120 that can be obtained, received, accessed, written, manipulated, created, or stored. The data 1120 can include, for instance, image data, LiDAR data, multi-modal sensor data, models, intermediate and other scene representations, or any other data or information described herein. In some implementations, the computing system 1100 can obtain data from one or more memory device(s) that are remote from the computing system 1100.

The memory 1115 can also store computer-readable instructions 1125 that can be executed by the one or more processors 1110. The instructions 1125 can be software written in any suitable programming language or can be implemented in hardware. Additionally, or alternatively, the instructions 1125 can be executed in logically or virtually separate threads on processor(s) 1110.

For example, the memory 1115 can store instructions 1125 that when executed by the one or more processors 1110 cause the one or more processors 1110 (the computing system 1100) to perform any of the operations, functions, or methods/processes described herein, including, for example, obtain multi-modal sensor data, removing one or more dynamic objects from the multi-modal sensor data, generating simulation data, etc.

According to an aspect of the present disclosure, the computing system 1100 can store or include one or more machine-learned models 1135. As examples, the machine-learned models 1135 can be or can otherwise include various machine-learned models such as, for example, inpainting networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the computing system 1100 can receive the one or more machine-learned models 1135 from the machine learning computing system 1200 over network(s) 1300 and can store the one or more machine-learned models 1135 in the memory 1115. The computing system 1100 can then use or otherwise implement the one or more machine-learned models 1135 (e.g., by processor(s) 1110). In particular, the computing system 1100 can implement the machine learned model(s) 1135 to generate scene representations by removing dynamic objects from multi-modal sensor data.

The machine learning computing system 1200 can include one or more computing devices 1205. The machine learning computing system 1200 can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices) can store data 1220 that can be obtained, received, accessed, written, manipulated, created, or stored. The data 1220 can include, for instance, multi-modal sensor data, intermediate representations, scene representations, simulation data, data associated with models, or any other data or information described herein. In some implementations, the machine learning computing system 1200 can obtain data from one or more memory device(s) that are remote from the machine learning computing system 1200.

The memory 1215 can also store computer-readable instructions 1225 that can be executed by the one or more processors 1210. The instructions 1225 can be software written in any suitable programming language or can be implemented in hardware. Additionally, or alternatively, the instructions 1225 can be executed in logically or virtually separate threads on processor(s) 1210.

For example, the memory 1215 can store instructions 1225 that when executed by the one or more processors 1210 cause the one or more processors 1210 (the computing system) to perform any of the operations or functions described herein, including, for example, training a machine-learned object removal model, generating simulation data, etc.

In some implementations, the machine learning computing system 1200 includes one or more server computing devices. If the machine learning computing system 1200 includes multiple server computing devices, such server computing devices can operate according to various computing architectures, including, for example, sequential computing architectures, parallel computing architectures, or some combination thereof.

In addition, or alternatively to the model(s) 1235 at the computing system 1100, the machine learning computing system 1200 can include one or more machine-learned models 1235. As examples, the machine-learned models 1235 can be or can otherwise include various machine-learned models such as, for example, inpainting networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the machine learning computing system 1200 or the computing system 1100 can train the machine-learned models 1135 or 1235 through use of a model trainer 1240. The model trainer 1240 can train the machine-learned models 1135 or 1235 using one or more training or learning algorithms. One example training technique is backwards propagation of errors. In some implementations, the model trainer 1240 can perform supervised training techniques using a set of labeled training data. In other implementations, the model trainer 1240 can perform unsupervised training techniques using a set of unlabeled training data. The model trainer 1240 can perform a number of generalization techniques to improve the generalization capability of the models being trained. Generalization techniques include weight decays, dropouts, or other techniques.

In particular, the model trainer 1240 can train a machine-learned model 1135 or 1235 based on a set of training data 1245. The training data 1245 can include, for example, labeled sequential multi-modal sensor data indicative of a plurality of environments at different timesteps. In some implementations, the training data can include a plurality of environments previously recorded by the autonomous vehicle with dynamic objects removed. The model trainer 1240 can be implemented in hardware, firmware, or software controlling one or more processors.

The computing system 1100 and the machine learning computing system 1200 can each include a communication interface 1130 and 1250, respectively. The communication interfaces 1130/1250 can be used to communicate with one or more systems or devices, including systems or devices that are remotely located from the computing system 1100 and the machine learning computing system 1200. A communication interface 1130/1250 can include any circuits, components, software, etc. for communicating with one or more networks (e.g., 1300). In some implementations, a communication interface 1130/1250 can include, for example, one or more of a communications controller, receiver, transceiver, transmitter, port, conductors, software or hardware for communicating data.

The network(s) 1300 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1300 can be accomplished, for instance, through a network interface using any type of protocol, protection scheme, encoding, format, packaging, etc.

FIG. 6 illustrates one example computing system 1000 that can be used to implement the present disclosure. Other computing systems can be used as well. For example, in some implementations, the computing system 1100 can include the model trainer 1240 and the training data 1245. In such implementations, the machine-learned models 1235 can be both trained and used locally at the computing system 1100. As another example, in some implementations, the computing system 1100 is not connected to other computing systems.

In addition, components illustrated or discussed as being included in one of the computing systems 1100 or 1200 can instead be included in another of the computing systems 1100 or 1200. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein.

What is claimed is:

1. A computing system comprising:
one or more processors; and
one or more computer-readable medium storing instructions that when executed by the one or more processors cause the computing system to perform operations, the operations comprising:
obtaining model structure data indicative of a plurality of parameters of a machine-learned model;
determining a codebook comprising a plurality of centroids, the plurality of centroids having a respective index of a plurality of indices indicative of an ordering of the codebook;
determining a plurality of codes respective to the plurality of parameters, the plurality of codes respectively comprising a code index of the plurality of indices corresponding to a closest centroid of the plurality of centroids to a respective parameter of the plurality of parameters; and
deploying the codebook and the plurality of codes as a compressed representation of the machine-learned model to an autonomous vehicle;
wherein determining the codebook comprising the plurality of centroids comprises learning the plurality of centroids concurrently with the plurality of codes to optimize a reconstruction error between the plurality of parameters and a reconstructed plurality of parameters that is reconstructed from the compressed representation of the machine-learned model.

2. The computing system of claim 1, wherein the plurality of parameters comprises a plurality of weights of at least one layer of the machine-learned model, the plurality of weights comprising a weight matrix of the at least one layer, wherein a length of the codebook is less than a number of plurality of weights of the weight matrix.

3. The computing system of claim 2, wherein the weight matrix comprises a plurality of subvectors, each subvector of the plurality of subvectors comprising a block of contiguous scalars in a column of the weight matrix, and wherein the plurality of codes are respective to the plurality of subvectors.

4. The computing system of claim 2, wherein the at least one layer comprises a fully-connected (FC) layer, and wherein the plurality of weights comprises weights of connections from a prior layer to the fully-connected layer.

5. The computing system of claim 2, wherein the at least one layer comprises a convolutional layer, wherein the plurality of weights comprises weights of a convolutional kernel, and wherein the weight matrix is reshaped into a two-dimensional matrix.

6. The computing system of claim 2, wherein a set comprising the plurality of centroids of the codebook is smaller than a set comprising the plurality of parameters of the machine-learned model.

7. The computing system of claim 2, wherein the weight matrix is permuted by a row permutation matrix, and wherein the operations comprise determining the row permutation matrix such that a determinant of a covariance of the plurality of weights is optimized.

8. The computing system of claim 7, wherein determining the row permutation matrix comprises:
obtaining an initial row permutation matrix that optimizes a product of diagonal elements of the initial row permutational matrix, wherein obtaining the initial row permutation matrix comprises:
determining a plurality of buckets of row indices;
determining a variance of each row of the weight matrix;
assigning each row index of the plurality of buckets of row indices to a non-full bucket that results in a lowest variance of the plurality of buckets; and
interlacing rows from the plurality of buckets such that rows from a same bucket are placed a number of rows apart; and
iteratively searching a plurality of candidate permutations of the initial row permutation matrix to select the row permutation matrix as a selected candidate permutation of the plurality of candidate permutations based at least in part on a determinant of a covariance of the selected candidate permutation.

9. The computing system of claim 1, wherein the reconstruction error is optimized by minimizing a covariance of the plurality of parameters.

10. The computing system of claim 1, wherein the closest centroid to the respective parameter is closest to the respective parameter in Euclidean distance.

11. The computing system of claim 1, wherein, subsequent to initialization of the plurality of codes and the codebook, the plurality of codes and the codebook are iteratively updated with random noise over one or more update iterations.

12. The computing system of claim 11, wherein, subsequent to updating the plurality of codes and the codebook with random noise over the one or more update iterations, the plurality of centroids is fine-tuned by gradient-based learning.

13. The computing system of claim 1, wherein the operations further comprise:
detecting one or more objects in an environment of the autonomous vehicle using the compressed representation of the machine-learned model; and
controlling the autonomous vehicle based on the one or more objects detected in the environment of the autonomous vehicle.

14. The computing system of claim 1, wherein the codebook comprises a lookup table comprising the plurality of centroids, and wherein the code index for the respective parameter indexes the closest centroid in the lookup table.

15. A computer-implemented method for compressing a machine-learned model, the method comprising:
obtaining model structure data indicative of a plurality of parameters of a machine-learned model;
determining a codebook comprising a plurality of centroids, the plurality of centroids having a respective index of a plurality of indices indicative of an ordering of the codebook;
determining a plurality of codes respective to the plurality of parameters, the plurality of codes respectively comprising a code index of the plurality of indices corresponding to a closest centroid of the plurality of centroids to a respective parameter of the plurality of parameters; and
deploying the codebook and the plurality of codes as a compressed representation of the machine-learned model to an autonomous vehicle;
wherein the plurality of parameters comprises a plurality of weights of at least one layer of the machine-learned model, the plurality of weights comprising a weight matrix of the at least one layer; and
wherein determining the codebook comprising the plurality of centroids comprises learning the plurality of centroids concurrently with the plurality of codes to optimize a reconstruction error between the plurality of parameters and a reconstructed plurality of parameters that is reconstructed from the compressed representation of the machine-learned model.

16. The computer-implemented method of claim 15, wherein the weight matrix is permuted by a row permutation matrix, and wherein the method comprises determining the row permutation matrix such that a determinant of a covariance of the plurality of weights is optimized;

wherein determining the row permutation matrix comprises:
obtaining an initial row permutation matrix that optimizes a product of diagonal elements of the initial row permutational matrix, wherein obtaining the initial row permutation matrix comprises:
determining a plurality of buckets of row indices;
determining a variance of each row of the weight matrix;
assigning each row index of the plurality of buckets of row indices to a non-full bucket that results in a lowest variance of the plurality of buckets; and
interlacing rows from the plurality of buckets such that rows from a same bucket are placed a number of rows apart; and
iteratively searching a plurality of candidate permutations of the initial row permutation matrix to select the row permutation matrix as a selected candidate permutation of the plurality of candidate permutations based at least in part on a determinant of a covariance of the selected candidate permutation.

17. The computer-implemented method of claim 15, wherein the reconstruction error is optimized by minimizing a covariance of the plurality of parameters.

18. The computer-implemented method of claim 15, wherein, subsequent to initialization of the plurality of codes and the codebook, the plurality of codes and the codebook are iteratively updated with random noise over one or more update iterations; and wherein, subsequent to updating the plurality of codes and the codebook with random noise over the one or more update iterations, the plurality of centroids is fine-tuned by gradient-based learning.

19. The computer-implemented method of claim 15, further comprising:
detecting one or more objects in an environment of the autonomous vehicle using the compressed representation of the machine-learned model; and
controlling the autonomous vehicle based on the one or more objects detected in the environment of the autonomous vehicle.

* * * * *